United States Patent [19]
Marks et al.

[11] Patent Number: 5,458,747
[45] Date of Patent: Oct. 17, 1995

[54] INSITU BIO-ELECTROKINETIC REMEDIATION OF CONTAMINATED SOILS CONTAINING HAZARDOUS MIXED WASTES

[75] Inventors: Robert E. Marks; Yalcin B. Acar; Robert J. Gale, all of Baton Rouge, La.

[73] Assignee: Electrokinetics, Inc., Baton Rouge, La.

[21] Appl. No.: 185,119

[22] Filed: Jan. 21, 1994

[51] Int. Cl.⁶ .................................................. B01D 61/42
[52] U.S. Cl. .................. 204/130; 204/180.1; 204/182.2; 588/204
[58] Field of Search .............................. 204/130, 182.2, 204/180.1; 588/204

[56] References Cited

U.S. PATENT DOCUMENTS

| | | | |
|---|---|---|---|
| 2,831,804 | 4/1958 | Collopy | 204/182.2 |
| 4,861,444 | 8/1989 | Schoessow et al. | 204/130 |
| 4,954,230 | 9/1990 | Kirch | 204/149 |
| 5,074,986 | 12/1991 | Probstein et al. | 204/130 |
| 5,098,538 | 3/1992 | Kim et al. | 204/182.2 |
| 5,137,608 | 8/1992 | Acar et al. | 204/130 |

FOREIGN PATENT DOCUMENTS

865225  9/1981  U.S.S.R. .

OTHER PUBLICATIONS

Perloff, W. H., and Baron W., Structure of Cohesive Soils, In Soil Mechanics, Principles and Applications, J. Wiley & Sons, New York, pp. 392–435 (1976)(no month).

Stevenson, F. J. The Carbon Cycle, In Cycles of Soil, J. Wiley & Sons New York, pp. 1–44 (1986)(no month).

Mall, Robert, The Design Criteria and Economics of Operating a Full–Scale Above–Ground Bioremediation Facility for the Treatment of Hydro–carbon Contaminated Soils. Presented at U.S. EPA 4th Forum on Innovative Hazardous Waste Treatment Technologies: Domestic and International, San Francisco, CA Nov. 17–19(1992).

Bulman, T. L., Newland, M. and Wester A. Insitu Bioventing of a Diesel Fuel Spill. Presented at U.S. EPA 4th Forum on Innovative Hazardous Waste Treatment Technologies: Domestic and International, 12p., San Francisco, Calif. (1992)(no month).

Foster, R. C., Rovira, A. D. and T. W. Cock, Ultrastructure of the Root–soil Interfaces, CSIRO, Adelaide, South Australia (1983)(no month).

(List continued on next page.)

*Primary Examiner*—John Niebling
*Assistant Examiner*—Arun S. Phasge
*Attorney, Agent, or Firm*—James Creighton Wray

[57] ABSTRACT

The invention relates to insitu bio-electrokinetic remediation of contaminated soil containing hazardous mixed wastes as organic pollutants and hazardous heavy metals. Bio-remediation of the organic pollutants is followed by removal of the hazardous material. Cultured micro-organisms, nutrients and growth factors are added to clean soil adjacent to contaminated soil. Positive anodes and negative cathodes are placed in the microbial-loaded clean soil adjacent to the contaminated soil. The negative cathode is closest to the interface of the clean and contaminated soil. DC current is applied between the electrodes and water containing cultured microorganisms is pushed by the electrokinetic pumping effect into the contaminated site. The acid generated at the anode is not allowed to enter the contaminated soil. Cultured microorganisms are introduced into clean soil on the opposite side of the contaminated soil. DC current is reversed to change the original anode to cathode and cathode to anode. Micro-organism laden water is pulled into the contaminated site. The push-pull current reversal process is repeated to increase insitu biodegradation efficiency. When the biological oxidation of organic pollutants is complete, the acid front enters the contaminated soil for removal of hazardous metals. Hazardous metals precipitate near or electroplate on the cathode or are recovered from fluid collected at the cathode. Solubilizing materials are added to the water near the cathode to minimize the precipitation reaction. Fluids collected at the cathode are pumped through a treatment system before water is returned to the soil.

19 Claims, 10 Drawing Sheets

OTHER PUBLICATIONS

Alexander, M., Fungi, In Introduction to Soil Microbiology, 2nd. Ed., John Wiley & Sons, New York, pp. 52–72 (1977)(no month).

Dragun, J., Organic Chemical Biodegradation in Soil. In the Soil Chemistry of Hazardous Materials, Hazardous Material Control Research Institute, Silver Spring, Maryland, pp. 235–445 (1988)(no month).

Eykholt, G. R., and Daniel, D. E., Impact of System Chemistry on Electro–osmosis in Contaminated Soil. Paper draft (1994). Texas Hazardous Waste Research Center.

Catallo, W. J., and Portier, R. J. Use of Indigenous and Adapted Assemblages in the Removal of Organic Chemicals from Soils and Sediments, In Proceedings of S cond International Conference of Waste Management in The Chemical and Petrochemical Industries Toxics Management. IAWPRC New Orleans LA (1991)(no month).

Brady, N. C., Forms of Macronutrients in Soils: Micronutrient Elements. In the Nature and Properties of Soils, Ninth Ed., MacMillan, New York, pp. 24–28, 364–383 (1984)(no month).

Guerra, G., Matthew, J., Bledsoe, B., and Pope, D. F., Bioremediation of Soils at a Waste Oil Facility, Presented at the U.S. EPA Fourth Forum On Innovative Hazardous Waste Technologies: Domestic and International San Francisco, Calif., Robert S. Kerr Environmental Research Laboratory, Office of Research and Development, ADA, OK (1992)(no month).

BioGenesis Enterprises Inc., BioGenesis SM Soil Washing. Paper distributed at U.S. EPA Fourth Forum on Innovative Hazardous Waste Treatment Technologies: Domestic and International, San Francisco Calif. BioGenesis Inc. Chicago, IL (1992)(no Month).

DeFilippi, A., and Lupton, F. S., Bioremediation of Chromium (IV) Contaminated Solid Residues Using Sulfate Reducing Bacteria, Presented at the I & EC Special Symposium, American Chemical Society, Atlanta, GA, Sep. 21–23 (1992).

Woodward–Clyde Consultants., Soil Venting to Remove DBCP from Subsurface Soils: A Case History. Presented at the U.S. EPA Fourth Forum on Innovative Wastes Treatment Technologies: Domestic and International, San Francisco, Calif., Woodward–Clyde Consultants, Oakland, Calif., (1992)(no month).

Garrels, R. M. and Christ, C. L. Ion Exchange and Ion Sensitive Electrodes, In Solutions, Minerals and Equilibria. Freeman Cooper and Co. San Francisco pp. 267–272 (1965)(no month).

Bohn H. L., McNeal, B. L. and O'Connor. Cation Retention. In Soil Chemistry, 2d, Ed., J. Wiley & Sons, New York pp. 153–183 (1985)(no month).

Benefield, L. D., Judkins, J. F., and Weand, B. L. Fundamentals of Surface and Colloidal Chemistry, In Process Chemistry for Water and Wastewater Treatment, Prentice–Hall, Englewood Cliffs N.J. pp. 191–210 (1982)(no month).

Jacobs, R. A., Sengun, M. Z. Hicks, R. E., and Probstein, R. Model and Experiments on Soil Remediation by Electric Fields, Presented at U.S. EPA 4th Forum on Innovative Hazardous Waste Treatment Technologies: Domestic and International, San Francisco, CA, Nov. 17–19 (1992).

Malherbe, B., ABR–CS Bioremediation: Full Scale Experiences with an In-Situ Treatment System for Sediment Volume–Reduction and Contaminant Mineralization in Harbors and Waterways, Presented at U.S. EPA 4th. Forum on Innovative Hazardous Waste Treatment Technologies: Domestic and International, San Francisco, CA, Nov. 17–19 (1992).

Electrokinetics Inc., Bench–Scale Testing Equipment for Electrochemical Extraction of Species from Soils. Description and Price List, EK–BR–11–1292, Electrokinetics Inc. LA Bus & Tech Center, Suite 102, LSU, South Stadium Drive, Baton Rouge La 70803–6100 (1992)(no month).

Dixon, J. B., and Wee, S. B., Montmorillonite and Other Smectite Minerals in Soil Environments, Soil Science of America Madison WI pp. 293–330 (1987) (no month).

Marshall, K. C., Mechanism of Adhesion, In Microbial Adhesion and Aggregation. Report on Dahlem Workshop on Microbial Adhesion and Aggregation, Springer–Verlag Berlin pp. 5–19 (1984)(no month).

Mueller, J. G., Lantz, S. E., Thomas, R. L., Remediation of Ground Water Contaminated with Organic Wood Preservative Using Physical and Biological Treatment Technologies, Presented at U.S. EPA 4th Forum on Innovative Hazardous Waste Treatment Technologies: Domestic and International, San Francisco, Calif. Nov. 17–19 (1992).

Speitel, G. E., Jr., Chlorinated Solvent Biodegradation by Methanotrophs in Unsaturated Soils, Journal of Environmental Engineering, vol. 117, No. 5, Sep./Oct. (1991).

DuPont, R. R., McLean, J. E., Hoff, R. H., and Moore, W. M., Evaluation of The Use of Solar Irradiation for the Decontamination of Soils Containing Wood Treating Wastes, Journal of Air Waste Management, 40:1257–1265 (1990)(no month).

Acar, Y. B., and Alshawabkeh, A. N., Principles of Electrokinetic Remediation, Environmental Science and Technology, vol. 27, 2638–2647 (1993)(no month).

Lynch, J. M. The Spermosphere and Rhizosphere: Interactions of Asymbiotic Microorganisms and Plants, In Soil Biotechnology, Microbiological Factors in Corp Productivity, Blackwell Scientific Publications, Oxford London, UK (1993)(no month).

Marks, R. E., Field, Stephen and Wojtanowica, A., Biodegradation of Oilbased Drilling Muds and Production Pit Sludges. Drilling Symposium, 1987. The American Society of Mechanical Engineers, New York, NY, pp. 1–7 (1987) (no month).

Marks, Robert E., Field, Stephen D., and Wojtanowicz, Andrew, Biodegradation of Oilfield Production Pit Sludges, Proceedings of 42nd Industrial Waste Conference. Purdue University, West Lafayette, Indiana, pp. 175–183 (1987)(no month).

Marks, Robert E., Biotreatment of Oilmuds and Production Sludges. Thesis, Louisiana State University and Agricultural and Mechanical College (1987)(no month).

Marks, Robert E., Field, Stephen D. and Wojtanowicz, Andrew, Oil Reduction in Drilling Wastes by Biological Treatment. Proceedings of a National Conference on Drilling Muds. Environmental and Ground Water Institute, pp. 78–104 (1987)(no month).

Marks, Robert E., Field, Stephen D. and Wojtanowicz, Andrew, Biological Treatment for Degradation of Oilfield Production Wastes and Enhancement of Secondary Dewatering Processes. Presented at the 60th Annual Conference of the Waster Pollution Control Federation, Phila. Penna. (1987)(no month).

Marks, R. E., Field, S. D., and Wojtanowicz, A. K., Biodegradation of Oil–Based Drilling Muds and Production Pit Sludges, Journal of Energy Resources Technology, vol. 110, No. 3, pp. 183–188 (1988)(no month).

Field, Stephen D., Wojtanowicz, Andrew W., Marks, Robert E., and Forbes, Lee, Biological Treatment of Petroleum and Petrochemical Hazardous Wastes, Second Annual Symposium on Hazardous Waste Research, Baton Rouge, LA (1988)(no month).

Marks, Robert E., A Laboratory Simulation of Natural Biodegradation of Weathered Crude Oil at a Louisiana Lakeshore: Using Both Native and Oil Acclimated Microbial Populations (1989)(no month).

Field, Stephen, Marks, Robert E., Ours, Dona, and Wojtanowicz, Andrew K., Biological Treatment of Petrochemical Sludges. Proceedings of the Third Annual Symposium on Hazardous Waste Research. Hazardous Waste Research Center, Baton Rouge, LA (1989)(no month).

Field, S. D., Forbes, L. Marks, R. E., and Wojtanowicz, A. K., Biological Treatment of Oilfield and Petrochemical Hazardous Waste. Presented at the Engineering Foundation Conference of Biotechnology Application in Hazardous Waste Treatment, Longboat Key, FL (1988)(no month).

Marks, Robert E., Field, Stephen D., and Wojtanowicz, Andrew K. Advanced Biological Treatment and Separation of Hazaradous Constituents from Petrochemical Sludges. Review by Doctoral Candidate on Progress of Work on PhD Proposal (1988)(no month).

Marks, Robert E., Field, Stephen D., and Wojtanowicz, Andrew K., Biodegradation/Partitioning of Benzo(a)Pyrene in Liquid/Solids Suspended Growth Systems. Proceedings of the 45th Industrial Waste Conference, pp. 179–185, Purdue University, West Lafayette, In (1990)(no month).

Marks, Robert E., Field, Stephen D., and Britenbeck, Gary A., In–Vessel Biological Treatment of Petrochemical Sludges for Enhanced Bioremediation. Proceedings of HMC–South '91 Conference and Exhibition, pp. 263–266, Houston, TX (1991)(no month).

Marks, R. E., Field, Stephen D., Wojtanowicz, Andrew, K., and Breitenbeck, Gary. Advanced Biological Treatment of Hazardous Constituents in K051 Petrochemical Sludges. Proceedings of the 46th Industrial Waste Conference, pp. 45–54, Purdue University, West Lafayette, IN (1991).

Marks, R. E., Field, S. D., Wojtanowicz, A. K., and Britenbeck, G. A., Biological Treatment of Petrochemical Wastes for Removal of Hazardous Polynuclear Aromatic Hydrocarbon Constituents, WAT. SCI. TECH., vol. 25, No. 3, pp. 213–220 (1992)(no month).

Marks, Robert E., Acar, Yalcin B., and Gale, Robert J., In Situ Electrokinetic Soil Processing for Removal of Hazardous Wastes in Clayey Soils. Proceedings of HMC–South '92, pp. 16–19, New Orleans, LA (1992)(no month).

Field, Stephen D., Marks, Robert E., and Wojtanowicz, Andrew K., Bench–Scale Performance. of Suspended–Growth Biological Treatment Processes for Petrochemical Sludges. Bioremediation: Fundamentals & Effective Applications. Lamar University Beaumont, Tx (1991)(no month).

Marks, Robert E., Biodegradation of Hazardous Waste Sludges in Suspended Growth Systems for Removal of Benzo a Pyrene and Other PNA's Dissertation. Louisiana State University and Agricultural and Mechanical College, Baton Rouge, LA (1987)(no month).

Acar, Yalsin B., Gale, Robert J., Marks, Robert E., Electrokinetic Soil Processing: Fundamentals of Removing Contaminants From Soils by Application of Electrical Currents—Synopsis. Electrokinetics Inc. Doe Workshop on Electrokinetics, Atlanta, GA (1992)(no month).

Acar, Yalcin B., Gale, Robert J., and Marks, Robert. Fundamentals of Removing Contaminants From Soils by Application of Electrical Currents (A Review of the State of the Art). DOE Workshop on Electrokinetics, Atlanta, GA (1992)(no month).

Marks, Robert E., Acar, Yalcin B., and Gale, Robert J., Electrokinetic Soil Processing: An Emerging Technology. 47th Annual Purdue University. Industrial Waste Conference. Purdue University, West Lafayette, IN (1992)(no month).

Taylor, Delia. LSU News Service, Nov. 1, 1992.

An Introduction to Electrokinetics, Inc. Electrokinetis Inc. Sep. 28, 1992.

Acar, Yalcin B. Electrokinetic Cleanups. Civil Engineering, pp. 58–60. Oct. 1992.

Letter from Robert Marks to Leonard Sedlin sending Absracts For: Electrokinetic Soil Processing: An Emerging Technology; A Rapid Contact Bioremediation Process for Destruction of Hazardous Organic Pollutants Extracted from Soils, Nov. 1992.

Acar, Yalcin B., Gale, Robert W., Putnam, Gregg, and Hamed, Jihad. Electrochemical Processing of Soils: Its Potential Use in Environmental Geotechnology and Significance of Ph Gradients, Preprint of Proceedings of the Second International Symposium Environmental Geotechnology, Shanghai, China (1989)(no month).

Acar, Yalcin G., Gale, Robert J., Putnam, Gregg A. et al., Electrochemical Processing of Soils: Theory of Ph Gradient Development by Diffusion, Migration, and Linear Convection. J. Environ. Sci. Health, A 25(6, 687–714 (1990).

Acar, Yalcin, and Hamed, Jihad. Electrokinetic Soil Processing in Waste Remediation and Treatment Synthesis of Available Data. Transportation Research Record No. 1312, Energy and Environmental Issues, pp. 153–161, (1992)(no month).

Alshawabkeh, Akram N. and Acar, Yalcin B., Removal of Contaminants From Soils by Electrokinetis: A Theoretical Treatise. J. Environ. Sci. Health, A 27(7), pp. 1835–1861 (1992)(no month).

Feasibility of Removing Uranium, Thorium and Radium From Kaolinite by Electrochemical Soil Processing. Electrokinetics Inc., Baton Rouge, LA (1992)(no month).

Fathepure, Babu Z., Tiedje, James M., and Boyd, Stephen A. Reductive Dechlorination of Hexachlorobenzene to Tri–and Dichlorobenzenes in Anaerobic Sewage Sludge. Appln. Environmental Microbiology, pp. 327–330, Feb. 1988.

Hamed, Kihad T. Decontamination of Soil Using Electro–Osmosis. Dissertation. Louisiana (1990)(no month).

Hamed, Jihad, Acar, Yalcin B. and Gale, Robert PB (II) Removal From Kaolinite by Electrokinetics. Journal of Geotechnical Engineering, vol. 117, No. 2, pp. 241–271 (1991)(no month).

Lageman, Reinout, Pool, Wieberen, and Seffinga, Geert. Electro–Reclamation: Theory and Practice. Chemistry and Industry, pp. 585–590, London, Society of Chemical Industry, Sep. 18, 1989.

Mitchell, James K. and Yeung, Albert T. Electro–Kinetic Flow Barriers in Compacted Clay. Transportation Research Record 1288(no date available).

Sims, Judith L., Suflita, Joseph M., and Russell, Hugh H. Reductive Dehalogenation of Organic Contaminats in Soil and Ground Water, EPA, Ground Water Issue, Jan. 1991.

Suflita, Joseph M. and Sewell, Guy W. Anaerobic Biotransformation of Contaminants in the Subsurface. EPA, Environmental Research Brief, Feb. 1991.

Jones, K. C. Stratford, J. A., Tidridge, P., and Waterhouse, K. S., Polynuclear Aromatic Hydrocarbons in an Agricultural Soil: Long Term Changes in Profile Distribution. Environmental Pollution, vol. 56, pp. 337–351 (1989)(no month).

Kozarac, Zlata, Hrsak, Drubravka, and Cosovic, Bozena. Electroanalytical Determination of the Biodegradation of Nonionic Surfactants. Environ. Sci. Technology., vol. 17, pp. 268–272 (1983)(no month).

INSITU BIO-ELECTROKINETIC REMEDIATION OF CONTAMINATED SOILS CONTAINING HAZARDOUS MIXED WASTES

BACKGROUND OF THE INVENTION

I. Introduction

The role of biodegradation as a process technology for use in decontamination of hazardous pollutants is clearly accelerating. New uses which incorporate use of microbial populations are being found every day. The strong interest in biotechnology processes for waste cleanups stems from a combination of economic, national health and other environmental driving forces. It is evident that congressional limits on financial resources dictate that the most cost-effective processes be employed to ameliorate contaminated sediments and soils which threaten population health or key environmental habitats. For example, the movement of hazardous wastes through surface and subsurface soils if not alleviated could result in significant poisoning of potable water aquifers and discharge of hazardous contaminants into navigable streams and rivers and result in contamination of edible fish and shellfish which are native to these waters. The estimates to decontaminate soils containing hazardous mixed wastes are in the range of many billions of dollars when using current approved technologies. These technologies focus on processes which include thermal destruction, solidification and encapsulation. The current philosophy of the United States Environmental Protection Agency is to stall current high cost remediation of many hazardous waste sites until lower cost alternatives become available through development of new emerging technologies. There is a trend which favors developing natural insitu versus exsitu processes. The natural insitu processes are expected to have minimal construction and mobilization costs compared to large costs of alternatives for excavating or mixing contaminated soils for use in other natural insitu or exsitu technologies. The costs of remediation may be increased further when using disturbed soil in exsitu technologies by inadvertent contamination of uncontaminated soils. The natural insitu process of biodegradation is predicted to extend the time of remediation but is predicted to be the process of choice for remediation of carbon-based hazardous wastes when compared to the majority of competing remediation technologies.

II. Background
A. Hazardous Wastes and Soil Classification Systems.
1. HAZARDOUS WASTES.

Severe problems exist in removal and destruction of hazardous wastes both in impoundments and as subsurface hazardous contaminants. These subsurface contaminants are typically classified into three categories. These categories include radionuclides, heavy metals, and organic pollutants. Many subgroups exist in each category. Contaminants may exist individually or in combined groupings. The toxic pollutants pose a health threat to man through the potential for and possibility of leaching of these contaminants through fissures and/or permeable soils into aquifers or recharge areas which provide sources of potable water. The majority of hazardous wastes are contained in some form of impoundment which can be composed of a simple clay pit bulldozed out of the ground or as elaborate as a hazardous waste landfill where multiple man made and natural compacted clay layers are used to prevent any hazardous leachates from escaping from the enclosed landfill.

2. SOIL CLASSIFICATION SYSTEMS.

Soils are typically classified by three systems which include: geologic origin, agricultural origin and grain size of the material, and engineering classification systems which comprise a common classification based on grain size, American Association of State Highway and Transportation Officials (AASHTO) for suitability of material for highway construction, and the Unified Soil Classification System (USCS) which is based on general engineering behavior of the soil. The latter system uses grain-size distribution and the Atterberg limits to classify fine-grained soils. The subsurface soils are composed of a broad range of materials designated by particle size into sands, silts, and clays. The reactivity of a soil is based on the surface area of the particular soil. The highest reactivities are exhibited by those clays which have the highest surface areas. The reactivity or activity of a clay soil is defined by equation 1:

$$A_C = \frac{I_p}{\% <2 \text{ microns}} \quad (1)$$

$$I_p = W_L - W_P \quad (2)$$

where $A_C$ is the activity of a clay and measures the colloidal behavior.

$I_P$ is the plasticity index and represents the range of water content where the clay is in the plastic state.

$W_L$ and $W_P$ are the Atterberg limits and define the plastic state for a clay.

%<2 microns represents the percentage of clay in a soil.

Clays are called cohesive soils and in natural settings are characterized by low permeabilities and restrict the flow of fluids as well as the movement of microbial populations.

The primary properties of cohesive soils (clays), are summarized in Table 1. The important properties of clay with respect to biological activity within clay soils is that clays typically contain substantial quantities of water ranging from 10 percent to fully saturated. Moisture is necessary for the survival of microorganisms. Clay soils can be thought of as natural resin exchange beds. Clay soils exhibit specific cation exchange capacities, negative polarity, and adsorb positive cations from the pore fluid or groundwater that is slowly moving through the clay soil. The pores in the clay soils can be smaller than the diameter of the rod-shaped soil microorganisms and thus can restrict movement of the microbial populations in clay soils. Sandy soils, on the other hand, are characterized by low surface area and high permeability, and thus do not retain significant quantities of moisture. Sands and gravels are readily drained and constitute the major unsaturated vadose zones in subsurface soils. Organic pollutants and soluble hazardous metals will be partly entrapped in sandy soils while rainfall percolation will carry a fraction of these pollutants to deeper depths where the contaminants will either be trapped in low permeability clay soils or leach into flowing streams and rivers.

B. Natural Microorganisms in Soils.
3. SOIL SURFACE HABITAT AND SIZE.

Soil microorganisms tend to congregate at the soil surface in a shallow layer of approximately 10 centimeters in depth. This shallow layer is referenced as either the weathering layer or the plough layer. The large majority of food (leaf fall, plant and animal detritus, etc.) is available at the soil surface. Natural biodegradation end products are fulvic and humic acids which may take up to 25–30 years to biodegrade. Microbial population size bears a direct relationship to the availability of food sources. Table 2 shows a distribution of microorganisms in the initial 75 centimeters of a soil profile and includes aerobic bacteria, anaerobic bacteria, actinomycetes, fungi and algae. The total aerobic and anaerobic bacteria in the upper 8 cm. of soil was 77–80 percent of the total bacteria found in the 75 cm. profile. 95 percent of all bacteria were found in the upper 25 cm. of the soil profile. Aerobic bacteria averaged between 80–90 percent of the total bacteria for the soil horizons investigated.

The indigenous microbial population was measured in a semitropical location where insitu bioventing was in progress at a diesel fuel site. All measurements were taken at depths of 200–280 cm. The soil contained only sandy and silty constituents and was very permeable. Standard plate counts reported as colony-forming units/gram varied from $10^2$ to $10^5$ CFU/gram.

Variances in the microbial population size show that the background microbial number (no diesel fuel) was between $10^2$–$10^3$ CFU/gram and a second background location containing diesel fuel was also in the same range. The microbial number range increased by a factor of 10 for the majority of the tests reported for the bioventing area or $10^4$ CFU/gram. The diesel fuel concentration varied from essentially zero (background) to a high of 7700 mg/kg. The highest microbial number $10^5$ CFU/gram was reported at the 200 cm. depth with a minuscule diesel fuel concentration of 0.2 mg/kg. It appears that increasing fuel concentrations inhibited the rates of microbial growth. Marks found analogous data for tests performed in high intensity continuous stirred aerobic sealed reactors when destroying API separator sludges containing step-up concentrations of highly toxic polynuclear aromatic (PNA) benzo(a)pyrene. An efficient process reactor would retain a microbial density between $10^7$ CFU/ml to $10^9$ CFU/ml. This density was maintained in long term study reactors for over 2 years using a natural adapted diverse microbial population. Marks found that, at 2,000–4,000 mg of benzo(a)pyrene per kg of dry feed solids, the microbial density varied from $10^7$ to $10^8$ CFU/ml. The microbial density declined to $10^6$ CFU/ml for all concentrations of benzo(a)pyrene tested between 10,000 up to 35,000 mg BaP/kg. These data also demonstrate the ability of an adapted natural microbial population to survive on increased dosing of a hazardous substrate. A one magnitude decline in population density occurred due to the inhibitory effect resulting from the increased dosing of the hazardous PNA. Nematodes and protozoa were observed to have difficulty surviving at the higher concentrations.

Bacteria have the capability of enlarging and armor plating the cell capsules by secretion of sticky materials for attraction of clay platelets or growing fibrils which trap clay particles. Electron microphotographs have shown rod bacteria growing fibrillar capsules and exuding a sticky film on the outside of the cell capsule for entrapment of clay platelets. Electron microphotographs of soil bacteria show that the bacteria can enlarge their diameters from 0.5–1.0 micrometers up to 1.0–1.5 micrometers through the armor plating techniques. The armor plated microbe has increased resistance to washout from the surface into deeper soil horizons where there is virtually no food supply and the armored bacteria also have better protection from predator attack. The majority of microbes strongly prefer to remain in the weathering layer of soils and use the mechanisms of natural cell enlargement and/or adhesion to large particles of soil to prevent wash-out.

4. RELATIVE SIZE OF SOIL CONSTITUENTS.

Table 3 shows the relative sizes of constituents in soils. It is noted that sand grains are very large (50–2,000 micrometers in diameter) and readily permit egress of the microbial populations through the large void spaces between the grains.

Contaminants are readily washed into sandy soils by natural rainfall and runoff. All varieties of microorganisms can readily move through the voids in sandy soils. Fungi and protozoa (14–600 micrometers in diameter) are found deeper in many sandy soils when sufficient moisture is present. Significant distribution of fungi in grass sod has been reported at 64–84 centimeters in depths.

Clay soil particles are very small (<2 micrometers) and the interstitial and pore spaces in clays is typically from 0.3–10 micrometers in size. The majority of microorganisms are not able to effectively pass through clays due to pore size restrictions. Thus microbial populations in clay soils can be characterized by very low population density and small diameters. The permeabilities of stiff clays will vary from $10^{-6}$ cm/sec to $10^{-10}$ cm/sec. Natural groundwater or pore fluid flows are highly restricted by stiff clay horizons. Hazardous organic and soluble heavy metal contaminants will percolate through sand lenses and are often retained by clay horizons. Dense non-aqueous phase liquids (DNAPLs) are an example where the heavy hydrocarbons will sink downwards in a permeable aquifer and accumulate as a glob on top of the accumulations of silts and clays in the bottom of the aquifer.

C. Hazardous Organic Compounds and Heavy Metals in Soils.

1. ORGANIC POLLUTANTS FOUND IN SOILS AND DEGRADATION RATES.

The two general classifications include naturally-occurring organic compounds and anthropogenic organic compounds. The rise in new types of the second category has resulted in accumulations of man-made compounds in soils.

Generally the more complex organic structures and degree of halogenation will increase the bioresistance. These compounds may bio-accumulate in the environment if left to degrade in the natural surroundings. The slowest degradation rates are encountered when the organic pollutants undergo land treatment or composting. The organic compounds will degrade much faster in well mixed soil systems. Biodegradation rates have been listed for over 300 organic chemicals in insitu and disturbed soil environments. Some of the environments include: soil incubation, soil percolation, activated sludge, groundwater testing, natural acclimated microbial flora, continuous flow and static culture biodegradation flask. Biodegradation rates are expressed in terms of biological half-lives and are usually first order rates. The well mixed systems using acclimated microorganisms are often orders of magnitude faster but costs are much higher.

2. EFFECT OF HEAVY METALS ON SOIL MICROORGANISM PROCESSES.

The impact of heavy metals on biological activity appears to be specific to the biological process and metal involved. Hazardous metals such as Ag, Cd, Co, Cu, Hg, Ni, Pb, Sn, and Zn have been reported to inhibit respiration as the concentration of the toxic metal is increased. The Ph range for 36 tests varied between 4.8 to 6.75 with the average Ph at 5. This indicated that an acidic pH environment is preferred. The addition of an organic food source negated the impact of most metals. All test media was sandy loam, loamy sand or silt loam, and results in clay soils may be different.

It has been indicated that microorganisms have adapted mechanisms for surviving in soils with relatively high metal concentrations. Findings have indicated that: (1) some microorganisms have energy-driven efflux pumps that keep intercellular concentration of metals low by pumping the metal out of a cell, (2) some microorganisms can convert enzymatically and intercellularly a more toxic form of an element or metal into a less toxic form, (3) other microorganisms can synthesize intercellular polymers that trap and remove metals from the intercellular solution, (4) certain microorganisms can bind large amounts of metal ions to their cell surfaces via precipitation or by covalent or ionic binding and (5) some microorganisms can biomethylate metals and the methylated form can then be transported out of the cell by a diffusion-controlled process.

D. Selection of the Microbial Population for Degrading the Specific Waste.

3. ENGINEERED MICROBES.

Experience in observing field tests of genetically-altered or engineered microbes has not shown very positive results. Tagged microorganisms that are constructed in an aseptic laboratory environment seem to have a limited opportunity when placed in a hostile field environment. There is a scarcity of food in soils, and the natural indigenous microorganisms have learned to survive over a few million years. Genetically-altered microorganisms released into soils are another food source for hungry indigenous microbial populations. The engineered microorganism is constructed to perform a specific function such as nitrogen fixation on soybean roots. The engineered microbe must be placed near to the soybean plant so it can participate in infection and the symbiotic acquisition of $N_2$. If the engineered microbe is not placed near a soybean root, then no infection will occur. The number and size of nodules which are related to infection by the engineered microorganisms must be compared to nodulation by the cross-inoculation group Rizobium Japonicum. Data has shown that at best nodulation by the altered microorganism was sometimes as efficient as the cross-inoculation group for symbiotic nitrogen fixation. There are also risk factors associated with use of an engineered organism.

4. ADAPTED AND ACCLIMATED INDIGENOUS MICROBIAL CULTURES.

An adapted microbial culture relates to the enhanced ability of the culture to survive and reproduce in a particular environment by natural modifications of the characteristics of the organisms. The environment in this instance is the organic contaminant in the insitu site. Acclimation is the lagtime period where indigenous cultures acquire the ability to degrade new and difficult organic pollutants. Both of these attributes must be acquired by an indigenous population to perform successful biodegradations.

One of the best methods found to develop a robust adapted microbial culture is to collect an indigenous population from contaminated media in the natural environment which is known to contain the hazardous waste of interest. This culture is composed of a multitude of species and already contains the genetic material necessary to degrade the waste. A stock culture can be maintained using a carbon source which contains the hazardous waste. For example, if one is planning an experiment to biodegrade high concentrations (100 mg/l) of benzo(a)pyrene, then one would look for a natural source of polynuclear aromatics (PNA's) that has been exposed to natural microorganisms. Excellent sources of microorganisms are contaminated soils adjacent to creosote-type wood preservation plants, and discarded creosote-dipped wood railroad ties or power poles. Chipped wood or sawdust also provides an extra benefit in that it is degradable (provides metabolic energy) and microorganisms can use this material for reaction sites. A stock culture from shredded railroad ties contained many types of bacteria including Pseudomonas and Athrobacter, actinomycetes, three varieties of fungi, five types of protozoa and nematodes. The adapted culture along with other biological and nutrients agents can be added to subsurface contaminated soils by mixing into extracted groundwater and re-injection of the biological agents-groundwater mixture.

One method to confirm that the developed culture is robust is to plate out the microbial culture in the laboratory using similar concentrations that were found in the contaminated media. Either pour plates or spread plates containing the appropriate concentrations of target toxic hydrocarbons should be plated on plain agar with the toxic waste as the only carbon source. Table 5 shows the pour plating of the inoculum of two adapted stock cultures using refinery API separator sludge and a petrochemical plant API separator sludge. Ten hazardous organic compounds were used to demonstrate that the cultures had developed the genetic responses for successful culture plating of 90 percent of the compounds. Plate counts are shown as culture-forming units/milliliter of stock culture (CFU/ml). Pour plating is preferred for measurement of microbial populations in subsurface soils, because microaerophilic organisms will grow on pour plates and not on spread plates. The enumeration of protozoa and nematodes is easily obtained by direct counting using a microscope. It should be recognized that all soil cultures are facultative and able to grow in oxygen-rich and oxygen-lean regimes. The oxygen-rich regimes are of course preferred as biodegradation rates will be approximately 100 times faster and result in a more cost-effective process.

5. MACRONUTRIENTS AND MICRONUTRIENTS.

The availability of specific elements called nutrients are essential to achieve high rates of biodegradation and destruction of the target hazardous organic compounds. Macronutrients and micronutrients are elements that are respectively required in moderate and trace quantities. The required macronutrients in soils have been identified as the elements carbon, hydrogen, oxygen, nitrogen, phosphorus, potassium, calcium, magnesium and sulfur. A typical concentration for a macronutrient would be 50 ppm. A listing for required micronutrients or trace elements required in quantities smaller than 50 ppm are iron, manganese, zinc, copper, boron, molybdenum, cobalt, chlorine, and occasionally, vitamins, silicon, iodine, fluorine, vanadium, and sodium.

Experience with soil biodegradations typically confirm that natural soil will contain all nutrients except for occasional shortages of the macronutrient nitrogen, and sometimes phosphorus or sulfur. Table 4 shows the oxygen uptake by a microbial population biodegrading a production pit sludge. The oxygen uptake by the microbial population is a measure of the metabolic rate of destruction of the organic material present. An additional 50 ppm of the three macronutrients nitrogen, sulfur, and phosphorus were added individually to each of three respirometers (one nutrient to each respirometer). Table 4 shows there was a significant increase in the oxygen uptake in the respirometer that had soluble nitrogen added. The biodegradation rate in that instance increased approximately fivefold. The macronutrient that may be in short supply at a field site is typically nitrogen.

INSITU BIOREMEDIATION AND COMPETITIVE TECHNOLOGIES

A. Land Treatment Soil Technology.

1. LAND TREATMENT OF REFINERY AND PETROCHEMICAL WASTES.

Land treatment is one of the simplest and cheapest technologies for surface biodegradation of hazardous organic compounds. The process takes advantage of the fact that almost 90 percent of all soil microorganisms are concentrated in the upper 25 cm. of surface soil and these indigenous microorganisms are used to destroy the organic compounds. Different methods are used to mix the hydrocarbon sludges into the upper layer of soils. The soils can be clays, silts or sands or mixtures as the hydrocarbon sludge or solution is mixed into the topsoil. This process is not a true insitu process as the soil is disturbed and the process is taking place in the surface weathering layer of the soil. The hazardous organic compounds are either tilled into the surface soils or sprayed as heavy liquids over the selected land treatment site. If hazardous metals are present, one or two percent hydrocarbons added to the mixture will usually prevent biological inhibition due to the presence of the metals. Other alternatives include use of a composting material such as chicken manure or whatever is available to provide the microbial population with a high energy food source which can be utilized to degrade the bioresistant organic pollutants.

a. An Example of a Pilot Land Treatment Study.

Corpus Christi Texas (Baldwin Waste Oil Site) was the site of an EPA pilot demonstration site. Residues from oily ballast sludges were used as the hazardous hydrocarbon which required remediation. Clay contents of the area soils are reported at 36 to 46 percent. Contaminated soil samples indicated BTEX up to 50 ppm, and elevated levels of lead chromium, barium, arsenic, and total petroleum hydrocarbons. Bioremediation technology was selected for the pilot testing program and natural soil microorganisms were used. The pilot study was set up as a land treatment unit. The treatment goals were to achieve concentrations of less than 1 percent oil and grease. The pilot site was 33 feet long and 12 feet wide and was surrounded by a 2 foot berm. An HDPE liner was placed under the bermed area. The depth of the contaminated layer was 8 inches. 2 inches of chicken manure was tilled into the soil. Steady state was achieved after 43 weeks. The pilot study was part of a demonstration project under EPA region VI. Oil and grease testing was used to determine when the process was deemed to be complete. No costs were reported for the 10 cubic yards treated. The report did not state the disposition of the hazardous heavy metals that were found in the initial sludge.

b. Suggested Advantages and Disadvantages of Land Treatment.

This method is one of the lowest cost alternatives and per ton estimates run from $10 to $50 depending on mobilization costs, runoff control facilities, operating costs, and closure considerations. High temperatures favor biological processes. Biodegradation of organic compounds at a tropical land treatment site are often completed in three months, whereas a subtropical case could require up to 30–40 months, and completed degradation at a land treatment site in a seasonal temperate climate could have a completion time of between 1–2 years. One disadvantage is that some toxic hazardous residues may remain in the surface soil. The residues have a potential for leaching as both runoff and percolation into lower soil horizons. Hazardous metals are concentrated at the site, and the toxicity of the topsoil will have been increased, after the hydrocarbons have been degraded. A second technology may have to be employed to remove the heavy metals.

B. Biological-assisted Soil Washing Technology.

1. REMOVAL OF HYDROCARBONS FROM CONTAMINATED SOILS.

Soil washing is typically carried out using either contaminated soil in disturbed condition or alternately digging out undisturbed contaminated soils and then soil washing the excavated soil. Most soils are capable of being washed for removal of volatile and non-volatile oils, crude oils, chlorinated hydrocarbons and pesticides, and other organics from most types of soils including clays. Pressurized water with additives (cleaners and surfactants), air and soil are added to the soil washing unit. Vapor extraction is often used to prevent spread of volatile organic compounds (VOCs). The hydrocarbon fractions are separated from the soil; the oil fraction is skimmed to an oil storage tank, and the aqueous wash liquid is returned to the washer unit. The larger particles of soil after washing are immediately removed to treated soil storage. The sediments consisting of silts and clays are directed to a well-mixed reactor, if hydrocarbon content of the fines has reached a specified concentration. Fines that are higher in hydrocarbon content are recycled back into the process.

a. An Example of a Soil Washing Process.

The BioGenesissm soil washing process technology was presented in November 1992 at the Fourth Forum on Innovative Hazardous Waste Treatment Technology. An overview of the process from BioGenesis Enterprises Inc. was distributed at the meeting and is shown in FIG. 1. This process uses both soil washing and biotechnology for removal of trace hydrocarbons from the silt/clay sediments. The first commercial use of the process was reported in October 1992, in removing crude oil from contaminated soils at mid-west refineries. A program is in progress to clean 5000 cu. yd. by early 1993. The washing rate of a single "Soil Remediation Unit" is reported to be 25 to 30 tons per hour. The surfactant used is reported to be completely biodegradable, has low toxicity and does not form complexes with organics. The surfactant is used in the final biodegradation step to reduce the sediments to a specified oil concentration of 10 ppm. An infrared detector is used to direct the flow of sediments either to the bioreactor or back to a ring chamber gravity separator. The company claims removal of 95 percent of heavy hydrocarbons for one wash cycle and 99+ percent for two cycles. The process cost is stated at $40–180 per ton with average range at $40–60 per ton. That process is classified as an exsitu process, as it is not performed in the subsurface contaminated undisturbed soil. There are multiple moving parts in the process including tanks, vacuum equipment, hydrocyclones, centrifuge, flotation units, gravity separators, coalescing filters, truck-mounted washer unit and earth moving equipment. The system is reported to be mobile and is operated by five personnel.

b. Suggested Advantages and Disadvantages for Soil Washing.

One advantage is the fast 25–40 ton per hour processing rates quoted which could interest some owners or PRP's in obtained prompt cleaning of a hazardous contaminated site, especially if public interests are involved. Equipment mobility is a second asset. The use of a tail-end bio-reactor should reduce the hydrocarbon concentrations to the standards prescribed for the region. The process recovered slop oils which would have an estimated value at $5–10 per barrel depending on crude source. That would be an offset to the quoted remediation costs. On the disadvantage side, the process is complex. A breakdown in one train could reduce the overall treatment rate. Crude oils are typically more easily separated from contaminated soils. The soil washing process was not tested with a sticky organic compound such as hexachlorobutadiene. Crude oils typically contain substantial heavy metals, and those metals are concentrated in the contaminated soil. The active soil after washing is described as suitable for "onsite backfill". It is implied that the treated soil is still hazardous with respect to heavy metals. Most processes are typically site-specific. It is assumed some laboratory treatability studies would be required for unusual cases. The process cost of $60–100 per ton is in the higher range by current standards for removal of contaminants from soils. It would appear that one of the largest operating costs is operating manpower and could run to $10,000–$15,000 per month.

C. Insitu Biological-assisted Venting for Hydrocarbon Removal.

1. INSITU REMOVAL OF DIESEL FUEL BY BIO-VENTING.

Bioventing is an emerging soil remediation technology with a good future when employed with sandy loam soils. It is a relatively cheap process, although remediation times may be long. Borings are used to locate the soil contaminated zone, and a hole casing is slotted in the zone where the pollutants are located. Respiration air for the microbial population is provided by surface blowers which extract the air from the contaminated zone and thus induce a flow of surface air to the contaminated soil zone. Nutrients are typically pumped into the site from surface feeder locations, and irrigation may be used to obtain more rapid percolation of those biological growth factors to the indigenous population.

a. The sequential use of Pump and Treat, Venting, and Bioventing of a Diesel Fuel.

A spill report by Campbell Environmental was distributed at the U.S. EPA Fourth Forum on Innovative Hazardous Waste Treatment technologies. Diesel fuel accumulated in an unconfined sand and silty aquifer. The zone of contamination was 1.5–2.5 meters in depth and extended over a total horizontal area of 2,000 square meters. The remediation plan used a 400 square meter plot as a pilot scale site. A schematic diagram of the pilot site is shown in FIG. 2. The attack plan has been to dewater the pilot site and to install air extraction bore holes and a micro-irrigation system. Two air injection systems were tested. Air was injected into the contamination zone, or the air was extracted from the contamination zone. Dewatering was a problem due to fluctuating water levels. The site was extended to 3.5 meters in depth.

m. The primary remediation criteria was to confirm effectiveness of nutrient supply and bioventing to meet proposed remediation criteria of 1500 mg/kg. Nine bore holes of PVC casing slotted between 2.5 and 4.5 m. were installed in the pilot site. A vacuum of less than 2 kPa was measured at all air extraction wells. A strong hydrocarbon odor was noticed initially but decreased over time. Vacuum pressures were measured at approximately 20 Pa at distances of 3 to 4 meters from the source wells. A drip irrigation system installed 15 cm. below the soil surface was used to provide nitrogen and phosphorus. Stock nutrients were made up with potable water and added with recovered groundwater via a dosing pump. Soil moisture was held at 60 percent.

A series of processes were used to remove the diesel fuel. Free product recovery by contaminated zone pumping and gravity separation was used for the first 15 months of the pilot remediation and was stopped when the diesel fuel concentration had dropped from 22,000 mg/kg to 10,125 mg/kg. The second stage involved dewatering and venting only and was continued for 6 months, and concentration declined to 7,200 mg/kg. The current ongoing phase includes venting and nutrient supply, and after 6 months the hydrocarbon concentration is 3,000 mg/kg or approaching the target of 1,500 mg/kg. The site is located near Perth, Australia, which should be attractive for a biodegradation process.

b. Suggested Advantages and Disadvantages of Process.

No costs were presented. In the pilot study presented, an advantage is shown for bioventing over simple venting. The removals rate of diesel fuel for venting alone (months 16 to 22) was approximately 500 mg/kg. The average diesel fuel content was about 10,000 mg/kg at the start of the simple venting. The removals of diesel fuel for the bioventing period (months 22–28) was approximately 700 mg/kg despite the fact that the initial concentration at the start of the bioventing period was 7200 mg/kg. The biological-assist in that case was cost effective in two ways. The microbial organisms were destroying diesel fuel in the subsurface soil, and smaller volumes of diesel were reaching the surface disposal equipment. In that case, the wells are shallow (6 m.), and equipment is simple. One disadvantage in the process as presented was the length of time for completion of the process. A telescoping of the three processes or an agent to more rapidly recover the diesel fuel would be more efficient. It is apparent this process would not work in compacted clay soils contaminated by hazardous hydrocarbons over a long period.

D. Soil Venting Technology.

1. SOIL VENTING OF LOW VAPOR PRESSURE COMPLEX ORGANICS.

Simple venting of soils where minimal biodegradation is involved is an emerging technology. In this instance it is not necessary to use biological or chemical agents to induce insitu biodegradation. Additionally, some categories of hydrocarbons such as chlorinated hydrocarbons and polynuclear aromatics are recalcitrant to biodegradation.

a. The example was chosen for simple bioventing of a high molecular weight chlorinated hydrocarbon.

3,100 gallons of Dibromochloropropane (DBCP) was spilled into vadose zone soils consisting of fine silty sands, coarse sands and some gravel. The groundwater was located at 100 feet. That pilot study by Woodward-Clyde Consultants was presented at the U.S. EPA Fourth Forum on Innovative Hazardous Waste Treatment Technologies. DBCP is a soil fumigant, and use was restricted in 1979 due to toxicity to mammals. DCBP has a melting point of 6.7° C., a boiling point of 195.9° C., specific gravity of 2.5 and solubility in water of <1 mg/ml. Initially three 10 foot corings advanced by dual-tube reverse-circulation techniques were completed by crews in Level B protective suits. FIG. 3 shows a schematic of the soil venting system proposed. The location was the San Joaquin Valley in California. An online gas chromatograph was used to measure subsurface concentrations of DBCP based on gas removal rates. The original samples were taken in 1987 and 1988, and average DBCP concentration was 750 microgram/kg. The process was started up in 1989 and shut down after 100 hours online. The system was reconfigured and started up in January 1992 and has been running continuously from that time. The half-life of DBCP is considered to be 2 years in soils, and it appears that of the original 60,000 pounds spilled, only 800 pounds remained in the soil column in 1988. Since January 1992, it is reported that 310 pounds of DBCP were removed from the area soils. As 50 percent of the DBCP is being destroyed naturally every 2 years , there is not much DCBP remaining in the soil.

Complete cost information has been provided and includes: initial drilling, sampling, lab analyses, process feasibility test $150,000, cost to design, permit, purchase and install system $200,000, initial two months trial program, including maintenance, power, sampling and analyses, reporting $60,000, one year remedial operating costs (March 1992 to March 1993) including maintenance, power, activated carbon replacements and disposal, sampling and analyses $200,000, site closure costs including final report but not including any post-closure monitoring $30,000.

Total average quantity of soil remediated was not estimated but could be as low as 30,000 cu. yd. or as high as 70,000 cu. yd. A suggested cost range would be between $10–20 per cu. yd. The operating costs for 9 months of 1992 are estimated at $150,000 and as cumulative DBCP for the 9 months was 310 pounds, the operating cost per pound of DBCP removed would be $483.

b. Suggested Advantages and Disadvantages.

The process works and the DBCP was in continuous decline after the redesigned equipment went on line in January 1992. Natural biological and chemical oxidation processes in the soils were slowly destroying that hazardous chemical, but the 1987/1988 sampling program detected that the DBCP was moving into the deep subsurface groundwater table. An insitu bioremediation program was called for and soil venting was selected. A disadvantage could be that the use of approved biological agents could have expedited the removal of DBCP and reduced the cost.

This process would not work well in silty clays due to the friction developed across the beds. A process which collected the DBCP at subsurface nodal points with surface recovery facilities might have proven to be more efficient.

E. Subsurface Groundwater Removal.

1. PUMP AND TREAT.

Pump and treat is a process where a hydraulic head is used either push or pull fluids (typically water) through the soil. Contaminants that are in the aqueous phase can be slowly recovered by that method. Only compounds that are soluble, miscible, or emulsified in the aqueous phase will be recovered. Pump and treat is being used in sandy loams and other permeable soils. Pumping is simply applied across a soil horizon. Since the soil is permeable, a cone or a cone of depression will form in most instances.

a. Suggested Advantages and Disadvantages of Pump and Treat.

An advantage may be that pump and treat is a simple process. If the contaminant is only in one location in a subsurface liquid pool, pump and treat might be an inexpensive alternative to other processes. Pump and treat, however has several disadvantages. Pump and treat cannot be used in fine grained soils, as the permeability of the soil is too low to permit any significant flow. Pump and treat is not readily applicable to removal of heavy metals or radionuclides, as the larger fractions of those compounds often are bonded to the soil surfaces and are not removed. Soluble organic compounds in fine to coarse sands can be removed by pump and treat, but efficiencies are low, and treatment times may be years. Recoveries are typically low with that type of process. Non-soluble organic contaminants which are adsorbed to surface clays are not readily removed. As pump and treat depends on hydraulic head, the subsurface fluid flow will follow pre-existing channels or fissures and will bypass high concentrations of contaminants which are lodged in clay lenses.

INSITU ELECTROKINETIC PROCESSING OF POLLUTED SOILS

A. Overview of the Insitu Electrokinetic Soil Remediation Process.

1. ELECTROKINETIC SOIL PROCESSING AS AN EMERGING TECHNOLOGY.

The development of electrokinetic soil processing (ESP) into an emerging technology was demonstrated at the EPA Fourth Forum on Innovative Hazardous Waste Technologies. The expansion of that technology has involved definition of electrode materials and exploration of the parameters that drive the electrokinetic soil process (ESP). Recent bench-scale tests and theoretical modeling efforts have described the basis for a more thorough understanding of the electrokinetic soil process. Applications for the process are being investigated outside of soil remediations.

B. Description of Electrokinetic and Hydraulic Phenomena.

1. THE ELECTROKINETIC-DRIVEN PUMP.

A simplistic view of the electrokinetic soil process as used in fine-grained soils is shown in FIG. 4. This figure displays the basic cation and anion movements towards the respective energized electrodes. A liquid pumping effect is observed when a direct current is applied between the anode and the cathode. The pore fluid is moved from the anode area and collects in the cathode area and may pool at the soil surface. Either the liquid must be pumped back to the anode, or equivalent new water must be added to replace any pumped away or lost liquid, otherwise shrinkage may occur near the anode region as a result of dewatering the soil. The black arrows show the counter clockwise flow of the pore fluid under the electrokinetic driving force. The acid front is depicted as it forms at the anode. The acid front, which is composed of hydrogen ions, will migrate towards the cathode. The electrokinetic driving forces are distributed fairly evenly throughout the soil.

2. THE ROLE OF CLAY AS A CATION EXCHANGER.

The acid formed at the anode is a clay-derived acid. As the clay acid moves towards the negative cathode, soil-adsorbed metal cations on the clay surfaces are exchanged with $H^+$ ions. Cation exchange capacity in general is defined at Ph of 7, as $H^+$ occupation of negative sites is small at solutions of 7 pH or higher. The movement of the acid front from the anode to the cathode, effectively performs the equivalent of an extraction function in the removal of other metals from their adsorbed sites. The cations are solubilized, but some may be precipitated out as oxides and hydroxides if a high pH zone is encountered near the cathode. The majority of soluble heavy metals will typically electro-deposit at the cathodes.

Cation exchange capacity is usually expressed as millequivalents of the exchangeable cation per 100 grams of exchanger. The exchanger is the clay mineral. The cation exchange capacity for the more common clay minerals is shown in Table 6. That table also shows that highly reactive clays such as montmorillonite and vermiculite have an average exchange capacity 10 to 12 times higher than the relatively inactive kaolinite. It is noted under the "structural control" column that highly reactive clays generate more negative forces than the mildly reactive clays. Vermiculite, for example, generates summed negative charges from the combined effects of: replacement of interlayer cations, substitution within the structural units, and unsatisfied valences on the edges of units. Kaolinite on the other hand is a low reactivity clay and generates negative charge only from unsatisfied valences on the edges of the structural units.

3. THE ROLE OF THE $H^+$ ION IN EXTRACTION OF METALS AND OTHER HYDROCARBONS FROM CLAY SURFACES.

a. Relative Ion Displacement of the Lyotropic Series.

The exchangeable metals adsorbed to the clay surfaces are adsorbed in terms of the relative ion displacement series shown in Table 6. Preference adsorption is given to the highest valence and the highest degree of hydration with the exception of the $NH_4^+$ and $K^+$ ions which are often adsorbed out of sequence due to strong attachments to some clay minerals. The soluble cations in the pore water which are attracted to the surface of the clay particles are called exchangeable ions. Those ions can be exchanged for other ions which have different valence and hydrated size. The adsorption mechanisms conform to typical demonstrated isotherms. Table 6 shows that the $Al^{+++}$ ion will replace any other adsorbed element listed, if all elements are at the same concentration. Note that the Halloysite hydrate combined with $4H_2O$ has approximately four times the cation exchange capacity at 40–50 meq/100 grams as the Halloysite hydrate combined with $2H_2O$ at 5–15 meq/100 grams.

b. Impact of the High Concentration of $H^+$ Ion on Desorption of Heavy Metals.

The concentration of the hydrogen ions generated by electrokinetic soil processing at the anode is much larger than the concentration of the other adsorbed elements, and accordingly $H^+$ ions replace the other metal cations at the sorption sites. A decline in total concentration of the $H^+$ ions will permit readsorption of other preferred displacement ions.

4. DEFINITION OF HYDRAULIC AND ELECTROKINETIC DRIVING FORCES.

The rates of groundwater flows through natural clays are defined by the following equation:

$$Q_h = K_h i_h A \qquad (3)$$

$Q_h$ is the flow under hydraulic conditions in $cm^3/sec$.

$K_h$ is the hydraulic conductivity or permeability in cm/sec.

$i_h$ is the hydraulic gradient.

A is the cross-sectional area in $cm^2$.

The rate of groundwater under a low milliampere direct current electro-osmotic driving force is given by the equation:

$$Q_e = K_e i_e A \qquad (4)$$

where $Q_3$ is the flow under hydraulic gradients in $cm^3/sec$.

$K_e$ is the electro-osmotic coefficient of permeability in (cm/sec)//(Volts/cm).

$i_e$ is the electrical gradient in volts/cm.

A is the cross-sectional area in $cm^2$.

The knowledge of the ratio of $Q_e/Q_h$ for a specific soil will describe the advantages, if any, for using the electrokinetic pumping effect to accelerate the pore water flow. The electrokinetic pumping effect will be smallest in very permeable soils and largest in more cohesive soils.

C. Description of the Basic Electrokinetic Process.

1. CHEMISTRY OF THE ELECTRODE REACTIONS.

When graphite electrodes are immersed in saturated or partly saturated soils and a direct current is applied across the soil specimen, the water in the immediate vicinity of the electrodes is electrolyzed. Hydrogen ions are generated at the anode, and hydroxyl ions are generated at the cathode according to the following primary electrode reactions.

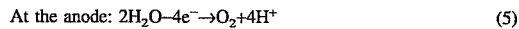
At the anode: $2H_2O - 4e^- \rightarrow O_2 + 4H^+$ (5)

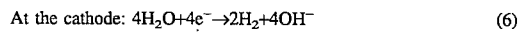
At the cathode: $4H_2O + 4e^- \rightarrow 2H_2 + 4OH^-$ (6)

Secondary reactions may exist depending on concentrations of available species

$H^+ + e^- \rightarrow \frac{1}{2}H_2$ (7a)

$Pb^{2+} + 2e^- \ldots > Pb$ (7b)

The acidic and basic boundaries at the anode and cathode have been defined, and the development of acid/base fronts have been formalized. The Ph at the anode will drop to below 2.0 and at the cathode will increase to above 12.0, depending on the applied current density. The accumulation of fluid generated by the electrokinetic acidic front at the anode advances across the soil specimen and accumulates at the cathode. If contaminants such as metal or radioactive cations, amphoteric hydrocarbons, organic bases or other compounds which have been conditioned to exhibit cation behavior are present in the pore water or adsorbed on the clay surfaces, those contaminants will flow towards and accumulate at the cathode.

2. DESCRIPTION OF THE CONTAMINANT TRANSPORT MECHANISM.

The transport mechanism for movement of contaminants through the vehicle of the concentrated acid front is by: advection of pore fluid due to prevailing electro-osmotic flow and internally or externally applied hydraulic potential differences, diffusion from concentration gradients, and ion migration due to electrical gradients. FIG. 5 shows the electro-osmotic flow, ion flow, the changes in electrical potential and hydraulic potential as current is applied. The coupled processes drive the acid front that advances across the specimen from the anode to the cathode and results in hydrogen ion replacement of exchangeable contaminant cations on the surface (desorption). The exchanged ions along with other cations and anions in the pore fluid will flow to the opposite charged electrode.

3. CONTROL OF ELECTROCHEMISTRY AT THE ELECTRODES.

Control of the electrochemistry at the anode and cathode is linked to generation of sufficient hydrogen ions for desorption of contaminants and solubilization of salts, for continued advection and maintenance of electro-osmotic flow. That will prevent decreased conductivity, which is believed to be due to either recombination of hydrogen and hydroxyl ions to form water or precipitation of species which is linked to rise in pH gradient at the cathode. Control of the electrokinetic soil process is realized through adjusting current levels to maintain desired pH, flushing the anode or cathode by a fluid of controlled pH and chemistry, buffering of the effluent/influent or use of special electrodes for altering boundary chemistry. Most metals will electrodeposit on the cathode. Mass balances for one-dimensional bench testing of cadmium Cd(II) and lead Pb(II) showed 75–95 percent electroplated on the cathodes.

4. LABORATORY TEST EQUIPMENT FOR SOIL TREATABILITY STUDIES.

With the advent of a new emerging technology such as electrokinetic soil processing, there are requirements for laboratory testing equipment which will initially duplicate the field process at bench-scale size. FIG. 6 shows a schematic diagram of an advanced design for a four-cell assembly unit. Each cell may be operated independently and will hold from 0.5 to 2.0 kilograms of contaminated soil. The cell size can be changed for smaller size samples. Computer data acquisition permits graphing of real time data. Two identical panels control the operation of 2 cells with respect to automated flow of pore fluid. Continuous monitoring equipment includes pH meters, current and voltage meters, positive displacement liquid flow meters, and soil conductivity meter readouts. A catalog is available which describes the equipment in detail. Experience has dictated that it is necessary to run field samples of contaminated soils in the laboratory in order to predict the best method for completing the field remediation.

5. EXPERIENCE WITH THE ESP PROCESS.

The ESP process is patented under U.S. Pat. No. 5,137,608 and has been used at bench, pilot and field scale to remove metals such as arsenic, cadmium, chromium, copper, lead, nickel, and zinc, and other contaminants such as uranium, BTEX, phenols, trichloroethylene and hexachorobutadiene, while radium and thorium are under investigation. Other uses for ESP are being examined and include removal of preservatives from wood, concentration of precious metals from mine tailings, and desalination of potable water aquifers.

BIO-ELECTROKINETIC REMEDIATION OF HAZARDOUS MIXED WASTES

A. Development of the Process for Rapid Insitu Bio-Electrokinetic Remediation of Soils.

1. THE NEGATIVE CHARGES OF REACTIVE CLAYS AND DIFFUSE DOUBLE LAYER THEORY.

Clay soils as shown in Table 6 are negatively charged. The strength of the charge is proportional to the surface area of the clay. The group of minerals known as smectites and including montmorillonite, beidellite, nontrite, along with vermiculite, are responsible for a large portion of the cation exchange capacity (CEC) in temperate climates. Exchangeable cations are attracted to the negatively charged surfaces of clays and surround clay particles. The cations are strongly held in low moisture environments such as in vadose zones in soils. That explains why heavy metals and hazardous organic pollutants in clays do not readily leach from contaminants bonded to the clay surfaces. The combined negative charges and the corresponding layer of exchangeable cations make up the double layer which has been termed a Hemholtz double layer. When water is added to the clay soil from rainfall percolation or other source the cations are no longer as tightly held, and diffusion from the bulk phase tends to equalize concentration gradients and the region near the clay soil is called the diffuse double layer (DDL). The cations become distributed at two concentrations with one interface at the clay surface and the other interface bordering the bulk solution. The CEC of the clay soil is proportional to the area between the cation interfaces. A strong cation bulk concentration gradient as provided by the $H^+$ ions in the acid front will collapse the DDL and release the adsorbed cations to the bulk solution.

2. BEHAVIOR OF MICROORGANISMS IN NATURAL CLAYS.

Soil microorganisms carry a weak negative electrical charge in a clay soil and may become attracted to the DDL of adsorbed cations which surround charged clay particles. In an unsaturated soil, the microorganisms will remain in static position or resting stage, and very little microbial activity will occur. In terms of mobility, soil microorganisms fall into two classifications: 1) disperse microorganisms which include mobile or free swimming such as a number of pseudomonas which have long tails or protozoa which are equipped with fibrillar hairs which accelerate them through the water and motile or non-swimming microorganisms which drift with the stray currents and 2) aggregated microorganisms which include those organisms which cluster and prefer an attached growth posture rather than remaining in a disperse phase. Wetting of soil will permit movement of the disperse microorganisms. Some soil microorganisms have the ability to change charge polarity and thus have some freedom of choice in movement in the soils.

SUMMARY OF THE INVENTION

B. Functioning of Soil Microorganisms Coupled with ESP.

1. PATENTABLE ASPECTS OF COUPLED INSITU/EX-SITU BIODEGRADATION-ELECTROKINETIC SOIL PROCESSES.

The addition of microbial populations into subsurface soils is patented under U.S. Pat. No. 5,137,608.

This invention provides for coupling and enhancement effects between natural microbial populations with the process of electrokinetic soil processing. The information contained hereinunder is novel and unobvious with respect to all coupled relationships described between insitu/exsitu biologically-driven oxidations or degradations by aerobic and/or anaerobic microbial populations for destruction of organic pollutants and concentration of heavy metals/radionuclides using the electrokinetic soil process as the pump priming process to extract, transport, concentrate and collect the organic pollutants, heavy metals and radionuclides from subsurface soils. The electrokinetic soil process performs two other important functions in removal of the heavy metals/radionuclides as hot spots of these contaminants are removed thus lowering the overall toxicity of the soil environment. The bio-availability of the toxic organic pollutants is increased and a more successful biodegradation of these compounds is insured.

2. EFFECTS OF DIRECT CURRENT ON MICROORGANISMS IN SOILS.

Microorganisms present in the contaminated soils are subjected to the following effects upon application of the direct current used in electrokinetic soil processing. The first effect is the pull of the negatively charged microorganisms towards the anode. Microorganisms which are able to change polarity have some control over their choice of habitats. A second major impact is the one-dimensional flow of pore fluid from the anode to the cathode, which in many cases may be stronger than the force of the applied electrical field, and may reverse the flow and sweep the microorganisms towards the cathode. Additionally many microorganisms can secrete an adhesive material and will anchor themselves to adjacent soil particles. If there is no electrochemistry control by conditioning fluids or other alternatives and the catholyte is re-injected at the anode, then the following conditions would apply. The pH at the anode would be stable in the range of 2–3, which would be low enough to destroy a number of the acid-intolerant microbial species, while base-intolerant species would be killed at the cathode where the pH would be in the range of 8–12. The ideal pH for soil microorganisms would be a range of 5–7 for best metabolic destruction of contaminants.

FIG. 7 shows a partly unsaturated bed of contaminated clay soil. The typical pore size is less than 5 micrometers, and only the smallest rod-shaped soil bacteria are able to enter the pores in the clay fabric. A cloud of cations surround the clay particles including both hydrocarbon contaminants and an example of a heavy metal Pb(II). High molecular weight hydrocarbons bond with the clay particles and also become trapped in the voids. Air pockets exist throughout the soil fabric. Some of the small microorganisms will remain in the resting or sporulation stages until an appropriate food source becomes available typically via surface runoff and rainfall percolation.

3. THE PUMPING EFFECT OF ESP ON IONS AND NONPOLAR ORGANICS.

The pumping effect of the electro-osmosis process is shown on FIG. 8. A current density of 10 microamperes/cm$^2$ of cross-sectional area is sufficient to initiate the pumping action and movement of the pore fluid. The hollow anode is shown to the right of the soil cross section and the cathode on the left. The acid front has advanced one third of the distance towards the cathode. Hydrogen ions are moving towards the cathode and displacing adsorbed metal ions as the $H^+$ concentration is much larger than the concentration of the respective cations. Polar organic compounds are moved towards the respective electrodes and amphoteric bases such as phenols and pentachlorophenols move toward the cathode. Nonpolar organics are moved towards the cathode by the pumping effect of the pore fluid, and the movement of the nonpolar organic compounds can be accelerated by the use of selected surfactants. Hydroxyl ions move towards the anode and form water on meeting a hydrogen ion or may precipitate as part of a metal oxide-hydroxide near the cathode where the pH is strongly basic. The segment of the microbial population that is engulfed by the advancing acid front either will be incapacitated, killed or will sporulate until the acid front has passed. A fraction of the original bacteria that reach the cathode will be killed by the high pH. Some bacteria will be unaffected. The bacteria found in the subsurface region are small, impoverished and usually not adapted to metabolize the hazardous contaminants.

C. Laboratory and Pilot Field Studies.

1. BENCH-SCALE STUDY FOR INSITU JET FUEL REMEDIATION.

a. Description of Testing Method.

In this test the jet fuel is destroyed in the subsurface soil formation, and the compacted clay is seeded with a microbial culture adapted to metabolize jet fuel. The process-generated petroleum residues and dead microorganisms will remain in the subsurface soils. The process is not well mixed, and thus it is much slower than if the biodegradation took place in well mixed tank reactors. It is estimated the jet fuel biodegradation could be carried out in one month in a well mixed aerobic reactor, and between 5–10 months by an insitu subsurface degradation. Economics would dictate the best alternative, and this decision would be site-specific.

b. System Startup.

A treatability study for jet fuel remediation is shown in FIG. 9. The sealed system includes a treatment cell, a pump to remove the accumulated pore fluids, a mixing tank for addition of biological agents and pH control systems at the anodes and cathodes. One to two kilograms of clay that has been soaked in jet fuel is compacted into the cell to approximately field conditions. A mariotte bottle (not shown) is often used to demonstrate that there is no hydraulic potential across the cell. After the electrodes are energized, the flow of pore fluid typically commences within 24 hours, and the pH control systems will be started up. There are several options for maintenance of pH. One option is to use a membrane at the cathode which prevents hydroxyl ions from traveling towards the anode and to control the pH at the cathode outlet to about 7. The mix tank will be at pH 7, and adapted microorganisms will be added to the mix after the pore fluid circulation has commenced. The circulation of pore fluid will open micrometer-sized preference channels through the clay fabric which will be enlarged enough for the passage of soil microorganisms. In this instance, we are not trying to extract heavy metals or radionuclides adsorbed onto the clay surfaces, and the acid front can be much more dilute than for heavy metal extractions.

c. Continuous System Operation.

Control of pH at the anodes will be required when the system is running at a specific direct current which will regulate the concentration of the $H^+$ ions. An ammonium hydroxide base will be used to control pH at approximately 5 at the anode. The added nitrogen can be used as a bacterial growth factor by the microbial population. The dissolved oxygen (DO) will be monitored at the outlet of the cathode and an air injection system in the mixing tank will be used to maintain the subsurface culture between microaerophilic and full aerobic state and will provide the shortest insitu bioremediation time. Advanced microorganisms which came from an original natural soil surface culture and which have been formulated into an acclimated and adapted stock culture and are periodically added to the mixing tank to achieve maximum penetration of microorganisms throughout the compacted clay. Performance control monitoring will include: routine sampling of the contaminated pore fluid stream for volatile organic compounds (VOC's), and daily pH samples taken from 4 connections located along the axis of the cell to verify that pH ranges are staying within the tolerances for high efficiency of the microbial population. Two blanks are run in step with the contaminated sample. The first blank will use hydraulic pressure only to move jet fuel out of the compacted clay, while electrokinetic soil processing will apply to the second blank. No microbial cultures will be added to the two blanks.

d. Final Testing at End of Treatment.

The electrokinetic process is stopped when steady state conditions are reached with respect to decline of contaminant jet fuel in the catholyte. The compacted clay block is cut into 5 sections and spatial samples taken from each section to determine if any significant concentrations of jet fuel remain in the compacted clay. Culture plating will be used to determine microbial population density in each section and homogeneity of the population throughout the clay soil bed at the end of the test program. Mass balancing of the jet fuel removal will be made as the final step in the program.

2. BENCH-SCALE STUDY FOR INSITU REMOVAL OF JET FUEL FROM CLAY SOILS USING FAST SURFACE AEROBIC REACTORS.

a. Description of Testing Method.

FIG. 10 shows a sealed double bed bench-scale treatability process for removal of jet fuel from compacted clay. In this case the biodegradation takes place in well mixed sealed aerobic tank reactors. An anaerobic reactor is available but is not required unless large quantities of halogenated hydrocarbons are found in the contaminated soils. Both skid-mounted reactors are located on top of the site. There are no significant microbial populations in the compacted clay beds, and pH control of the raw feed to the aerobic reactor is required to maintain the optimum 5–7 pH range. This process has the option of either pumping the petroleum residues and microbial sludge into the compacted clay or sending this material to an anaerobic digester. This process is fast, and the time of the rate limiting degradation step has been significantly reduced when compared to the insitu remediation process described under section B.1.

b. System Startup and Continuous Operation.

The initial catholyte contains both dissolved and undissolved jet fuel in the contaminated pore fluid. The total stream is collected in a raw feed tank, and then pH is controlled to 5–7 for addition to the aerobic reactor. The microbial population is added to the aerobic reactor, and wood chips or sawdust is added to provide the microbial population with growth factors and locations for reaction sites. The decanted liquid is returned to the anodes for injection into the double beds. The aerobic reaction produces acids, and the raw feed water tank influent will be pH adjusted so that the aerobic reactor will typically operate at a pH of 5.5–6.0. A final filtration or centrifugation step is included in case it is decided not to inject the biodegradation end products into the site. Bench-scale testing will determine whether it is necessary to include a biodegradable surfactant in the aerobic reactor clarified effluent. This decision will depend on whether the destruction rate of jet fuel in the aerobic reactor is exceeding the removal rate of jet fuel by electrokinetic soil processing of the compacted clay beds. The use of double beds increases the quality assurance/quality control (QA/QC) of the testing method. Air and fertilizer (nitrogen, phosphorus and sulfur) will be added to the aerobic reactor as required. This reactor will have its own clarifier and microbial recycle. The balance of the sludge is either pumped back into the clay or processed in an anaerobic digester. The control on the process will be the measurement of VOC. When steady state is attained, the process will be stopped. Steady state conditions are defined as no significant concentrations of jet fuel found in the contaminated pore fluid for a period of 10 consecutive days.

d. Final Testing at End of Treatment.

The beds will be sliced into 5 slices and each slice will be checked for any jet fuel not removed by the electrokinetic soil processing step. Mass balances are made to confirm jet fuel removals.

3. FIELD PILOT TESTING FOR INSITU REMOVAL OF HAZARDOUS ORGANIC COMPOUNDS.

a. Description of Testing Method and System Startup.

FIG. 11 shows a cross section of a pilot test in contaminated subsurface soils at a field site. Original samples are taken on a specified grid to one foot below the contaminated depth and at locations both on and off the site. Core borings will typically be used to obtain contamination depth profiles. All electrokinetic soil processing will be performed using one-dimensional arrays. This type of remediation will mean closer placements between anode and cathode arrays. In terms of specific spacings, the distances between anodes will be 2.5 feet and the distance between anode arrays and cathode arrays will be 5 feet. That should reduce the probability of finding any non-remediated areas within the pilot site at the conclusion of the test program. The electrode arrays are encased in slotted polyvinyl chloride (PVC) pipes, and a surface mixing tank is used to add an adapted microbial population to the subsurface soils.

A two part startup is planned. The first part involves operating the pilot site for heavy metals removal. The pore fluid moving through the site will commence deconcentration, distribution and removal of the organic pollutants. Initially the contaminated groundwater will be returned to the anode region and recirculated. A cation membrane will effectively prevent hydroxyl ion movement from the cathode into the clay bed and will later prevent microorganisms from exiting the bed with the circulating groundwater. This step will also detoxify the site with respect to reducing heavy metal inhibitory influences that would affect the performance of the adapted microbial populations injected into the site. The second part of the process will be to pump the contaminated groundwater to the mixing tank and to commence injection of the microbial population along with the pH control program at the anode. pH control will also be initiated at the cathode to maintain pH in the range of 5–7. This insitu method will be slow, as the microbial populations are operating at low efficiencies in the subsurface soils.

b. Continuous Operations.

A filter system may be used after the pH control unit at the cathode, as some soluble heavy metals that did not electrodeposit on the cathode may precipitate, and it would not be desirable to have these precipitated metals accumulating in the mixing tank. Continuous operations will be monitored until steady state conditions are observed and either pore water flow drops off through the pilot site or there is repeated low and constant concentrations of organic pollutants in the contaminated groundwater. Monitoring wells outside the site will contain continuously reading pH meters and any significant changes in pH readings would indicate movements onto or from the subsurface site. Sampling would immediately be undertaken to ascertain the reasons for any pH deviations.

c. Final Testing at End of Treatment.

At this time, a final set of site samples would be taken and integrated into a mass balance to determine removals of various metals and hazardous organics.

4. REMOVAL OF HAZARDOUS MIXED WASTES FROM A PILOT FIELD SITE BY RAPID INSITU BIO-ELECTROKINETIC REMEDIATION OF SOILS (FIG. 12).

a. Description of Testing and Startup.

The wastes must be identified by specified grid and depth testing through coring or alternate means. Laboratory treatability studies of the mixed wastes must first be run to verify that the two classifications of wastes: heavy metals/radionuclides and organic pollutants can be separated. This process uses surface bio-reactors, and if the waste can be separated, the bio-reactors should significantly reduce the quantities of organic pollutants. The heavy metals and the radionuclides may pose a toxic threat to a successful bioremediation and in any event should be prevented from entering the bio-reactors. The bio-reactors are located at the site surface and use natural adapted surface microorganisms. The electrokinetic soil process is started up to electrodeposit and precipitate out heavy metals and radionuclides. The initial groundwater pumped from the subsurface site will be pH adjusted to precipitate out and collect any soluble heavy metals or radionuclides. The organics (soluble, volatile, and insoluble) will collect in a bioremediation feed tank. If significant quantities of halogenated hydrocarbons are in the mixed waste, the anaerobic reactor will be used, and the contaminants will be recycled until a decline in the concentration of chlorinated hydrocarbons is observed. Makeup pore fluid if required will be added to the system to balance changes in system inventory.

b. A Review of the Operating System.

Soda ash or caustic soda will be used to increase the pH of the contaminated groundwater from 4–6 to 10–12. The heavy metals and radionuclides will precipitate at the high pH. The precipitates are collected in sealed containers. The organic-rich contaminated groundwater is pumped to the biodegradation feed tank where growth factors (typically nitrogen, wood chips) and pH conditioning agents are added to the bio-reactor feed. Soil microbial cultures are facultative and perform either in the aerobic or anaerobic mode. Performance criteria are established for the bio-reactors such as mean cell and volumetric residence times and cell recycle. Biodegradable surfactants may be added to the purified groundwater to increase yield of organic pollutants remaining in the site. A final filtration system will be available to filter out organic tars and bioresistant compounds which would not degrade. These materials will be concentrated and placed in sealed containers. The use of pH meters located in, outside and below the remediation site will be used to detect if any acidic or basic materials are either entering or leaving the remediation site. If any pH changes are observed in the outside monitors, a high priority sampling program will be initiated to determine the cause. The process will remain operating until the contaminated groundwater and the purified groundwater approach the same quality.

c. Final Testing at End of Treatment.

Final site samples will be taken, and mass balances will be made for all contaminants where sufficient data is available. This process is expected to be much faster than the fully insitu process depicted in FIG. 11.

5. ADDITIONAL NEW AND NOVEL USES FOR COUPLED EFFECTS STEMMING FROM INTERACTIONS OF MICROBIAL AND OTHER BIOLOGICAL AGENTS/PROCESSES WITH VARIATIONS IN THE DIRECTION OF THE ELECTROKINETIC PUMPING EFFECT. THESE EFFECTS INCLUDE ELECTROKINET-AIDED PULSED FLOWS AND FLOW REVERSALS WHICH WILL INCREASE REMEDIATION EFFICIENCY FOR INSITU BIODEGRADATION AND REMOVAL OF HAZARDOUS MIXED WASTES FROM CONTAMINATED SOILS.

a. Laboratory Testing for Removal of A) Hazardous Organic Pollutants and B) Hazardous Metals or Radionuclides through Application of Electrokinetic Pulsed or Reverse Flows.

This application of the process to a contaminated soil in a test cell is shown in FIG. 13. The test cell (B) will contain contaminated soil with both hazardous organic pollutants and hazardous heavy metals in the soil fabric. The loading cell (A) contains natural uncontaminated soil. The impact of the toxic metals will be neutralized by usage of an organic food source such as ground wood chips or other cheap aliphatic organic chemical available at a specific site. An organic is usually needed in any event to provide the energy for cometabolic degradation of the hazardous organic compound. The injection of biological agents will be loaded into the test cell and then the electrokinetic process will be started. The cells will be saturated and the acid front will push the biological agents into the contaminated test cell. The test cell will be uniformly saturated with the biological agents (acclimated microbial population, surfactants, inorganic growth factors and an energy source if needed). Any organic recovered in the groundwater during the initial movement of the biological agents into the test cell are re-injected into the test cell for final degradation.

The hazardous metals can now be removed by reversing the test cell (A) polarity. This is accomplished by direct current reversal. The positive anode will now be at the right end of cell (A) and the negative cathode will now be between cell (A) and cell (B). The acid front will be pushed through test cell B and extraction of the hazardous metals will occur. This operation will be continued until the existing process fluid does not show any hazardous metal cations.

b. Field Site Demonstration of This Alternative Process Showing How Biological Agents Can Be Rapidly Injected Into Contaminated Soil Sites Containing Organic Pollutants.

FIG. 14 shows a plan view of a scenario where organic pollutants are found in a contaminated soil. The top shows the initial state. An electrokinetic cell in uncontaminated soil is located to the left of the site contaminated with organic pollutants (OP's). The center site contains the OP's and uncontaminated soil (open area) located at the right side.

The center picture shows the effect of moving biological agents (BIO-A's) into one half of the contaminated site. The process is stopped when the acid front has reached the edge of the contaminated site. Some OP's may have been pushed into the uncontaminated area. BIO-A's are now added to the clean soil to the right of the contaminated site. The polarity of the electrokinetic cell is reversed as shown in the bottom figure. The acid front reverses and new BIO-A's are added to the original contaminated site, thus providing a very significant bio-enhancement for the insitu bioremediation.

FIG. 15 shows a plan view where multiple electrokinetic cells can be placed around a contaminated soil site and bioremediation will be enhanced through usage of laminar pulsed and reverse polarity flow regimes.

It is noted that many other scenarios can be envisaged using either laminar electrokinetic pulsed flow (a single pulse followed by process stoppage when a biotreatment scheme has been applied to the contaminated site) and polarity reversal (for enhancing either the biotreatment scheme or to remove a soil blockage caused by metal oxides, carbonates or hydroxides). The latter polarity reversal technique may be important in some soils containing excessive metal cations such as calcium.

CONCLUSIONS AND SUMMARY

It is evident that new biologically-oriented emerging technologies are going to play more substantive roles in cleaning up Superfund sites, in restoration of polluted aquifers, and in many acres of contaminated subsurface soils. The costs of biologically-based technologies are predicted to be at the low end of the "per ton" scale. With a national economy unable to divert billions of dollars into remediation activities, the slower biotechnologies may become the mainstays of the majority of remediation programs.

Land treatment, bioventing, bio-assisted soil washing, insitu biodegradation, exsitu biodegradation, and the coupled processes of either insitu and exsitu biodegradation paired with electrokinetic soil processing have been discussed. New biological processes are under development. Some examples where specific microorganisms have been identified for use in unusual biodegradations include: degradation of plutonium, thorium and creosote. The new coupled technology of electrokinetic soil processing (ESP) where the groundwater pumping function of ESP will be utilized under controlled conditions to bring together the microorganisms and the contaminants at subsurface sites for accelerated low cost remediations is promising. It is predicted that the use of ESP to control the movement of microbial populations will be a cost-efficient process and will develop into a mainline technology program which will make the environment safer at a much lower cost than is now predicted by many environmental economists. New alternatives are expected daily as more and more high technology companies develop biological solutions as lower cost alternatives compared to more conventional higher cost solutions to remediation problems.

These and further and other objects and features of the invention are apparent in the disclosure, which includes the above and ongoing written specification, with the claims and the drawings.

DETAILED DESCRIPTION OF THE DRAWINGS

Figure 1:
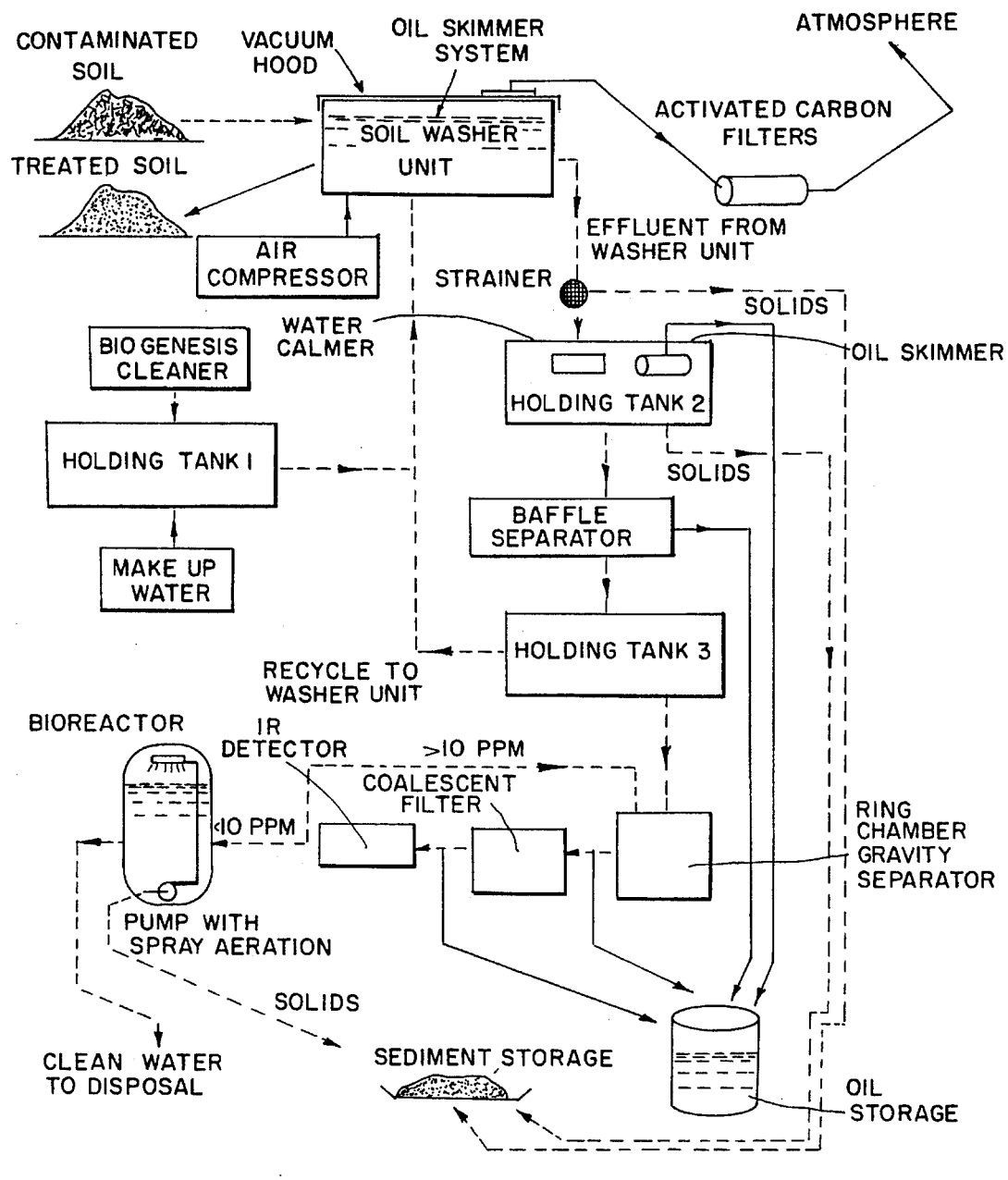
FIG. 1 shows facilities for washing hydrocarbons from soils.

Referring to the drawings, FIG. 1 shows a prior art soil washing process for washing hydrocarbons from soil. The process had complex steps and required the movement of soils.

Figure 2:
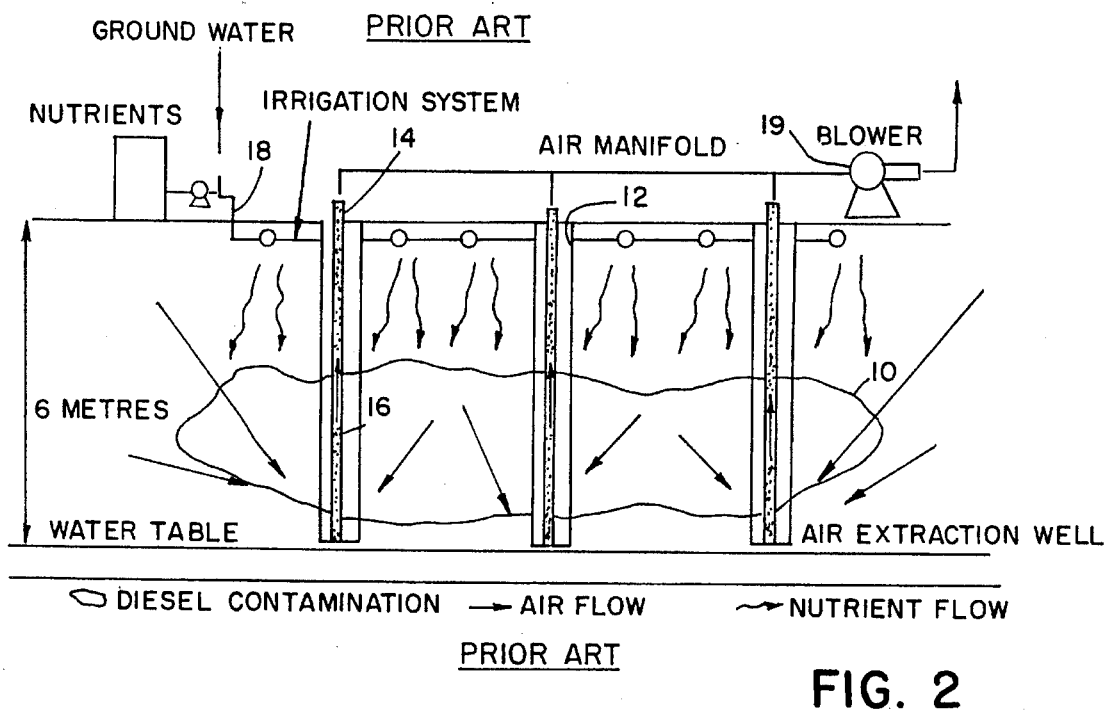
FIG. 2 is a cross-section of a pilot site for bioventing of diesel fuel.

FIG. 2 schematically shows the bioventing of spilled diesel fuel. Wells 12 are drilled. Test cores show contamination depths. Suction tubes 14 with openings 16 at contaminant levels are inserted in the wells, and water with nutrients is spread over the contaminated area by an irrigation system 18.

Water and nutrients flow downward and fumes are removed by blower 19.

Figure 3:
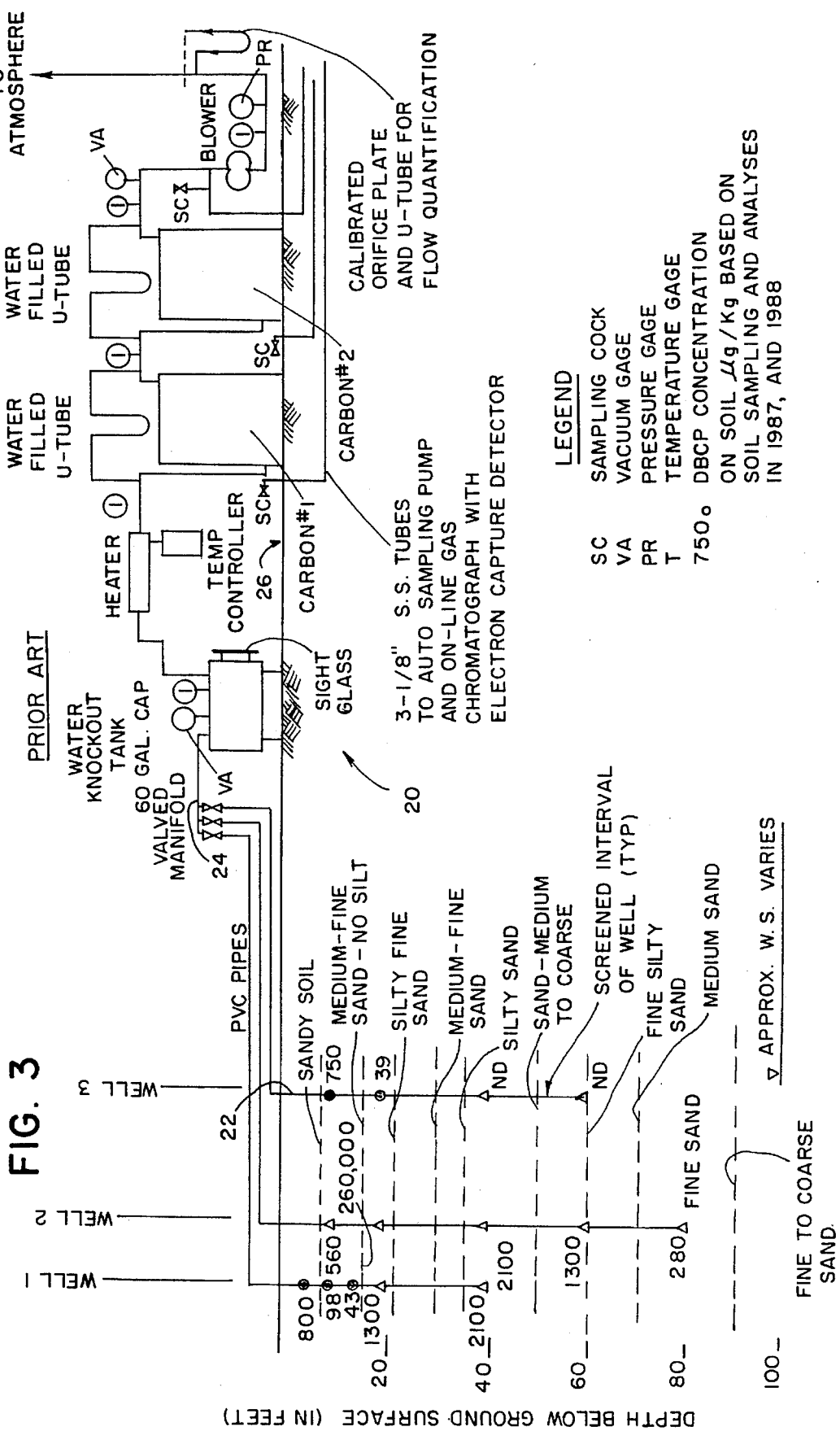
FIG. 3 shows a pilot site for soil venting of dibromochloropropane.

FIG. 3 shows a system 20 which was used for venting of a contaminant. Wells 22 were drilled. Gas and liquids were removed with reduced pressure in line 24 and were separated by the complex equipment 26.

Figure 4:
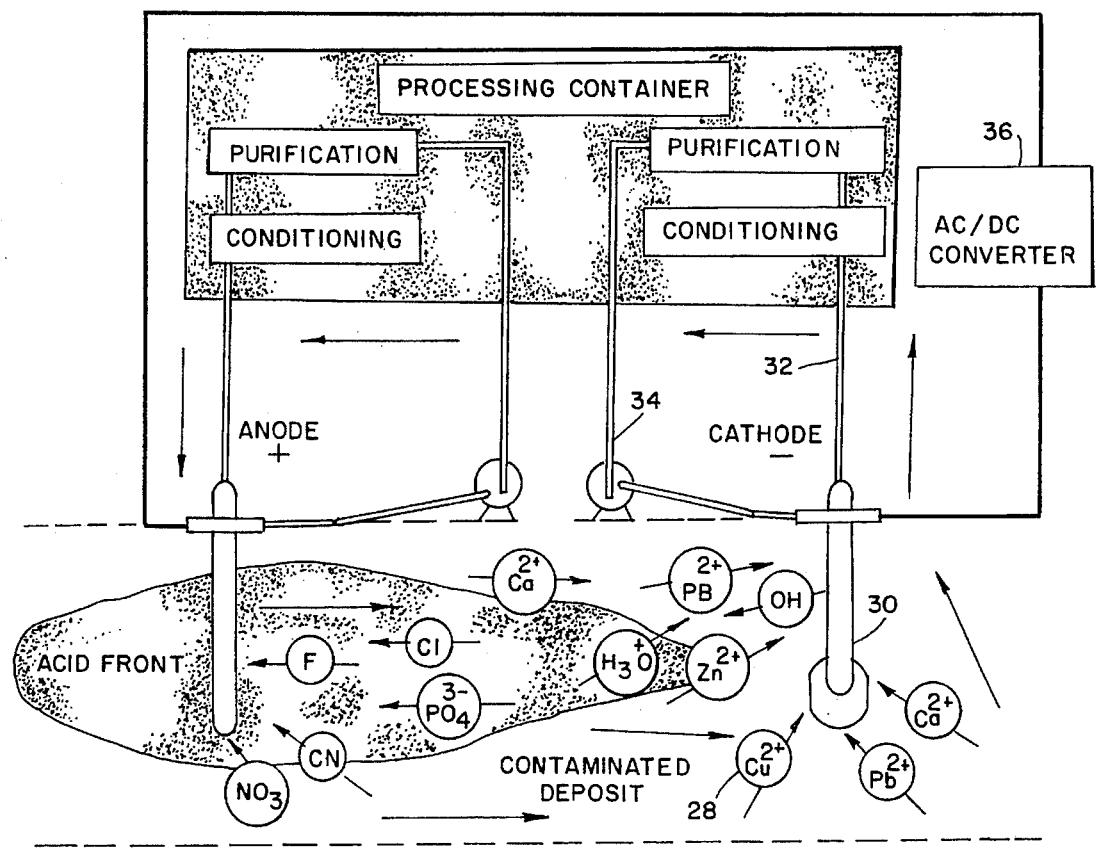
FIG. 4 is a schematic diagram of the electrokinetic soil process.

FIG. 4 is a simplified diagram of an electrokinetic soil remediation process showing the flowing of ions 28 toward the electrodes 30, and the removal 32, purification and reintroduction 34 of groundwater while a potential is established between the anode and cathode by power source 36.

Figure 5:
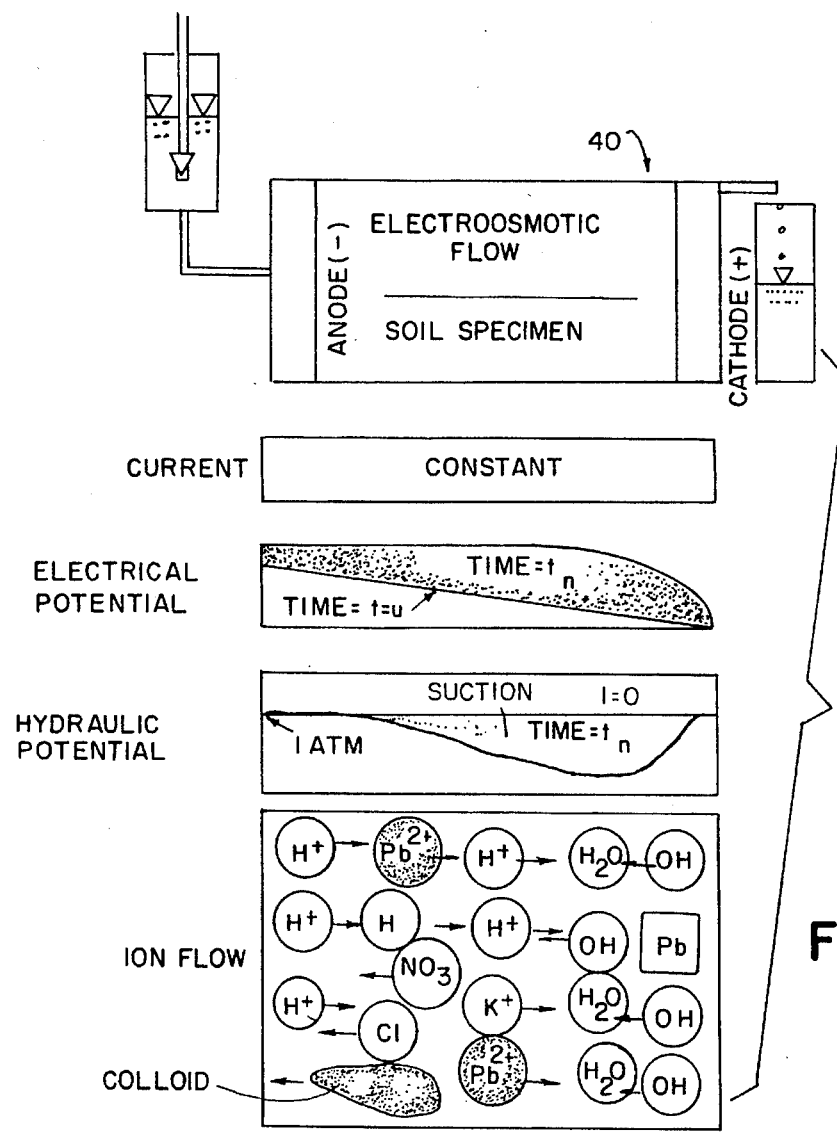
FIG. 5 shows one-dimensional test conditions and potential for electrokinetic soil processing.

FIG. 5 is a schematic representation of an electrokinetic soil processing system 40, showing electroosmotic flow and the movement of water between the anode and cathode. The constant current, changing electrical potential and hydraulic potential are represented graphically, and the ion flow is shown schematically.

The injection process may include any or all insitu processes such as electrokinetic soil processing with acid front movement, overburden soil surface flooding, injection in bore holes and drip injection.

Figure 6:
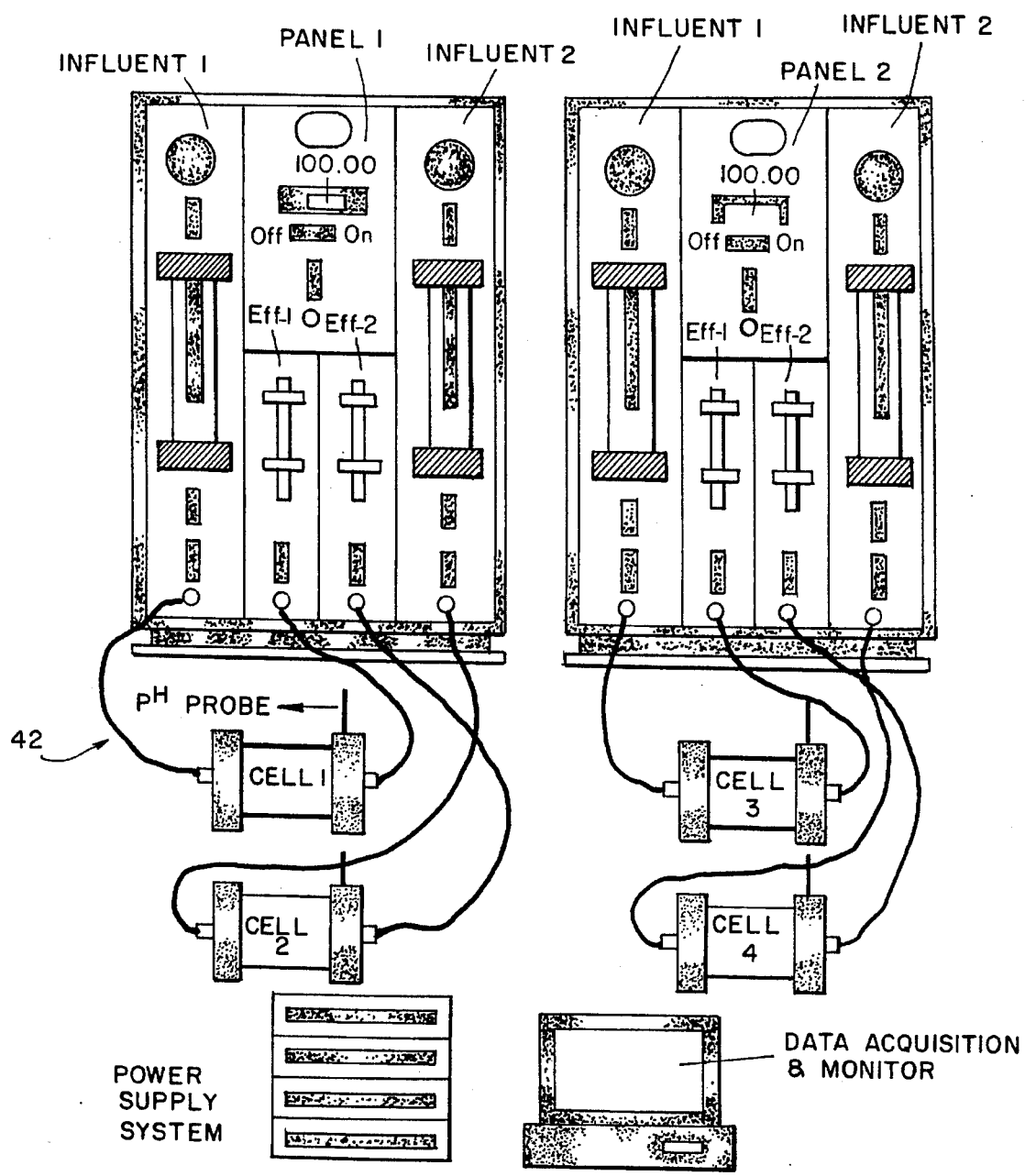
FIG. 6 is a schematic diagram of a four-cell treatability unit.

FIG. 6 is a schematic diagram of a four-cell treatability test unit 42 for soil remediation.

Figure 7:
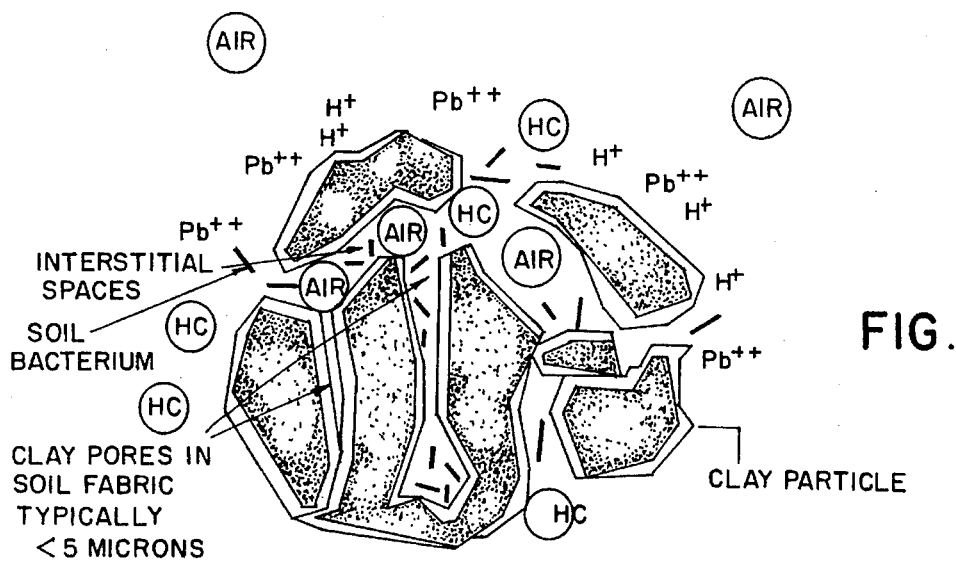
FIG. 7 is an enlargement of a cross-section of a soil particle showing voids, water layer on soil surfaces, bacteria, cations and air bubbles.

FIG. 7 is a schematic representation of a soil particle and the relationship of ions, air and bacteria.

Figure 8:
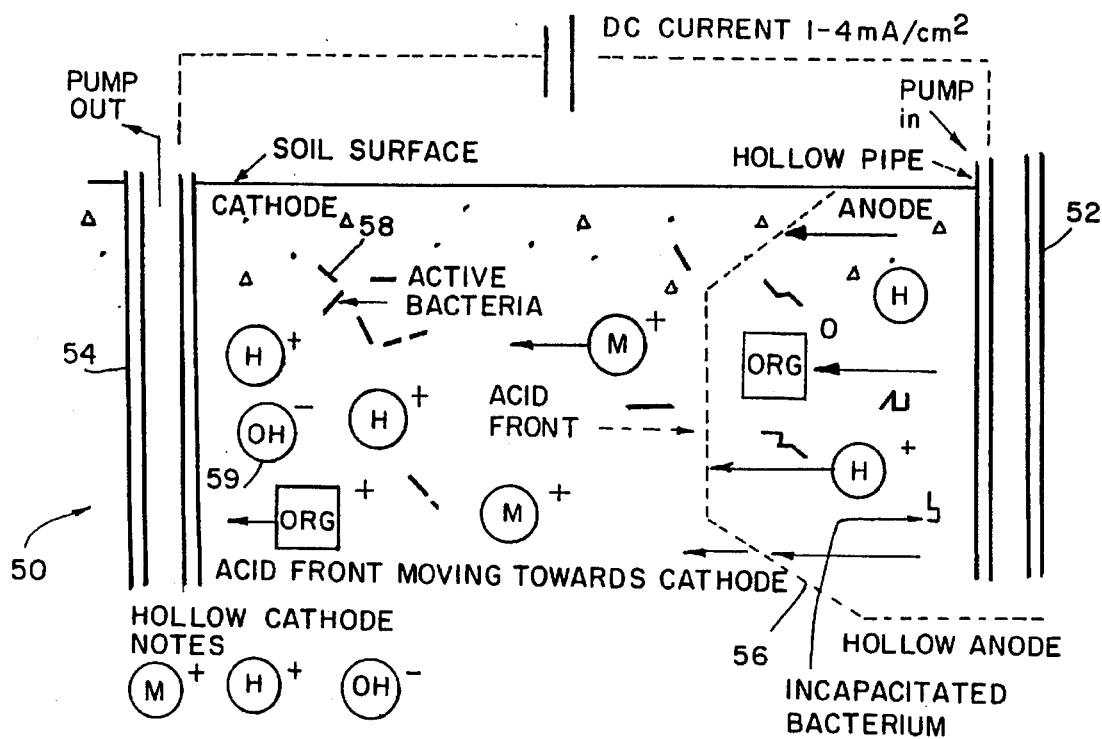
FIG. 8 shows capture, collection and transport of subsurface pollutants by insitu electrokinetic remediation of subsurface soils.

FIG. 8 shows an electrokinetic soil remediation system 50 in which water flows from near a hollow anode 52 to near a hollow cathode 54, shows the acid front 56 moving toward the cathode, and shows the movement of ions and bacteria 58 toward the cathode and the movement of hydroxyl ions 59 away from the cathode.

Figure 9:
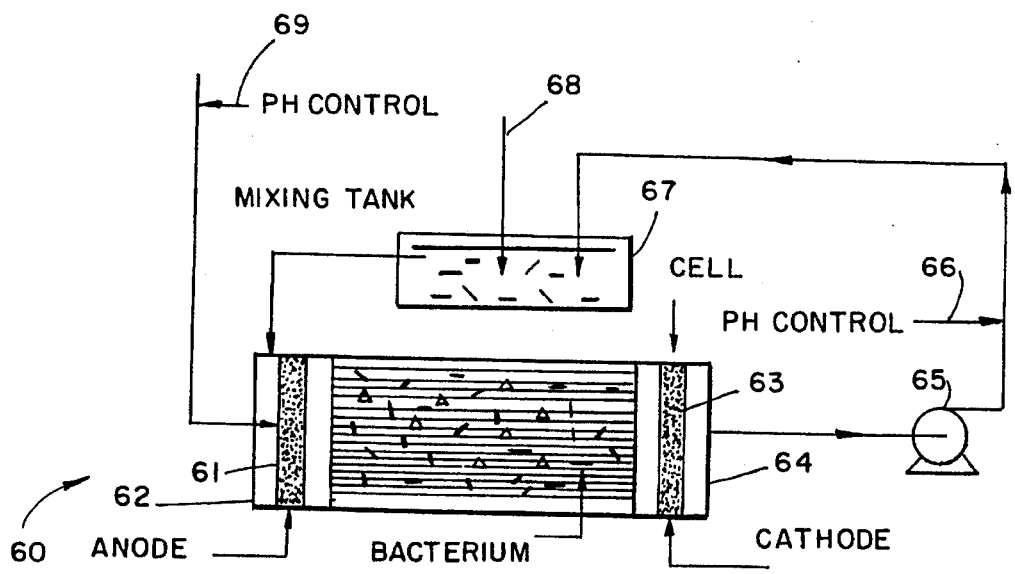
FIG. 9 shows an insitu bench-scale laboratory treatability study for removal of jet fuel from clay-based soils and sediments.

FIG. 9 shows a preferred system of the present invention, which is generally indicated by the numeral 60. An anode 61 is provided in anode well 62, and a cathode 63 is provided in cathode well 64. Pump 65 withdraws water from the cathode well, and a pH controller 66 adjusts the pH of the water to between 7 and 7.5. The water is supplied to tank 67, and a source of bacteria 68 supplies bacteria to the tank 67. Water from the tank flows back to the anode well 62. A pH trim control 69 adjusts the ph to between 5 and 7.

Figure 10:
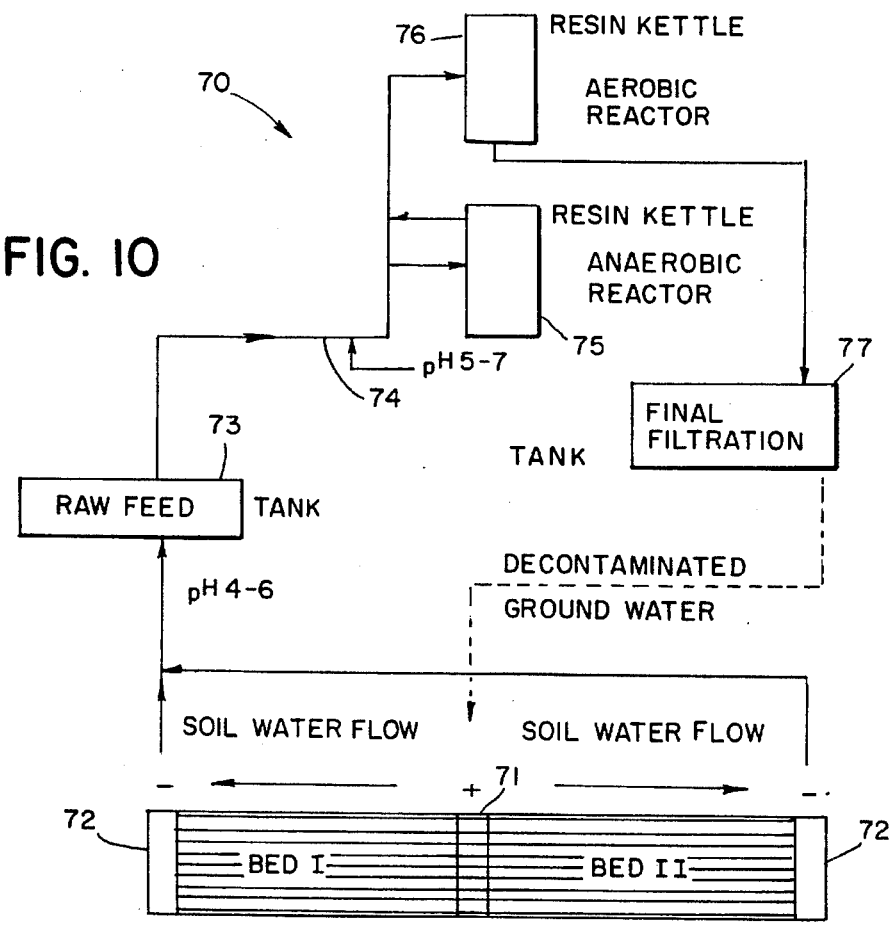
FIG. 10 shows lab test facilities for removal and destruction of organic pollutants in jet fuel from contaminated clay soils.

FIG. 10 shows a simplified system 70 of the present invention, with a central anode 71 and spaced cathodes 72. Water is withdrawn from wells adjacent the cathode and may have a pH of from 4 to 6 when it is stored in the raw feed tank 73. The pH adjuster 74 adjusts the pH to 5 to 7, anaerobic reactor 75 treats the water, and an aerobic reactor 76 treats the water. The pH adjustment of 5 to 7 is intended to promote bacterial growth and action. A final filter 77 removes contaminants before the water is introduced to a well by the anode 71.

Figure 11:
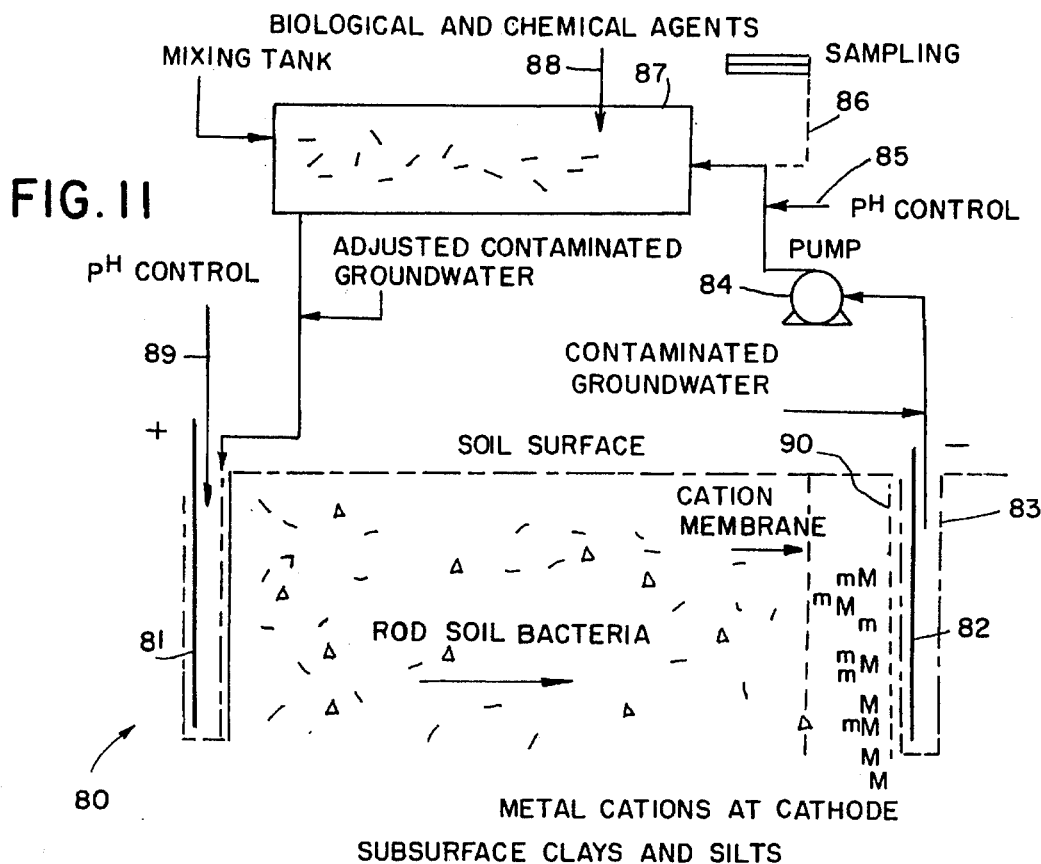
FIG. 11 shows insitu bio-electrokinetic field remediation of soils.

FIG. 11 shows a preferred form of the invention generally indicated by the numeral 80. A potential is established between an anode 81 and a cathode 82. Contaminated groundwater is withdrawn from cathode well 83, and pumped 84 to a pH controller 85 and a sampler 86. The water flows into tank 87 and is mixed with biological and chemical agents from source 88. The adjusted groundwater with the biological and chemical agents is reintroduced into the well adjacent the anode 81, and a pH trim control 89 controls the pH in the water adjacent the anode. A cation membrane 90 concentrates metal cations near the cathode.

Figure 12:
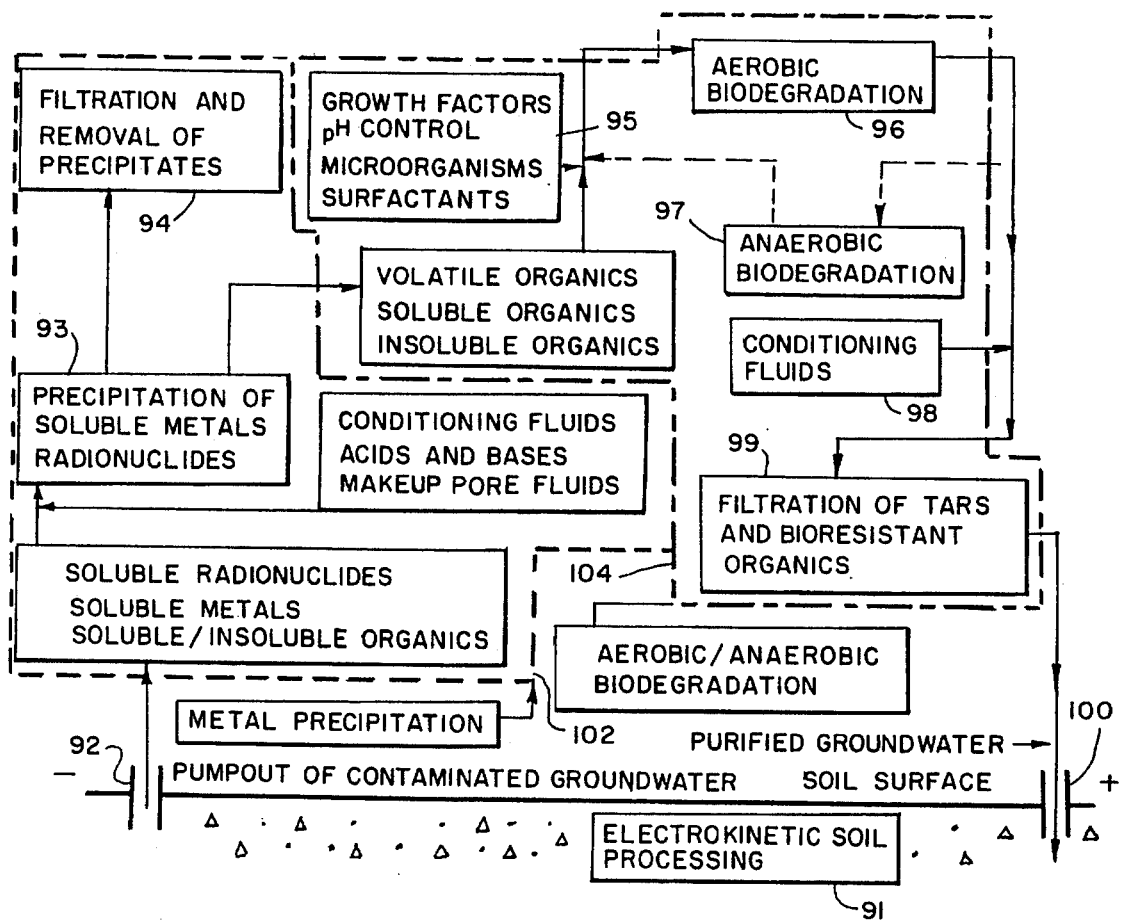
FIG. 12 shows removal of hazardous mixed wastes from site fluids by the process of rapid insitu bio-electrokinetic remediation of soils.

As shown in FIG. 12, hazardous waste is removed by an electrokinetic soil processing system generally indicated by the numeral 91. Water is removed from the cathode well 92, and is subjected to precipitation 93 and filtration 94 for removal of metal and radionuclide precipitates. The water containing volatile organics and soluble and insoluble organics receives growth factors, pH control, microorganisms and surfactants from source 95, and is subjected to aerobic biodegradation in reactor 96 and anaerobic treatment in reactor 97. Conditioning fluids are added 98, and finally tars and bioresistant organics are filtered 99 before the water is returned to a well 100 near the anode.

The two main sections of the treatment system are the metal precipitation in section 102 and the aerobic and anaerobic biodegration in section 104, in conjunction with the added microorganisms and growth factors 95, and the electrokinetic soil processing 91.

Figure 13:
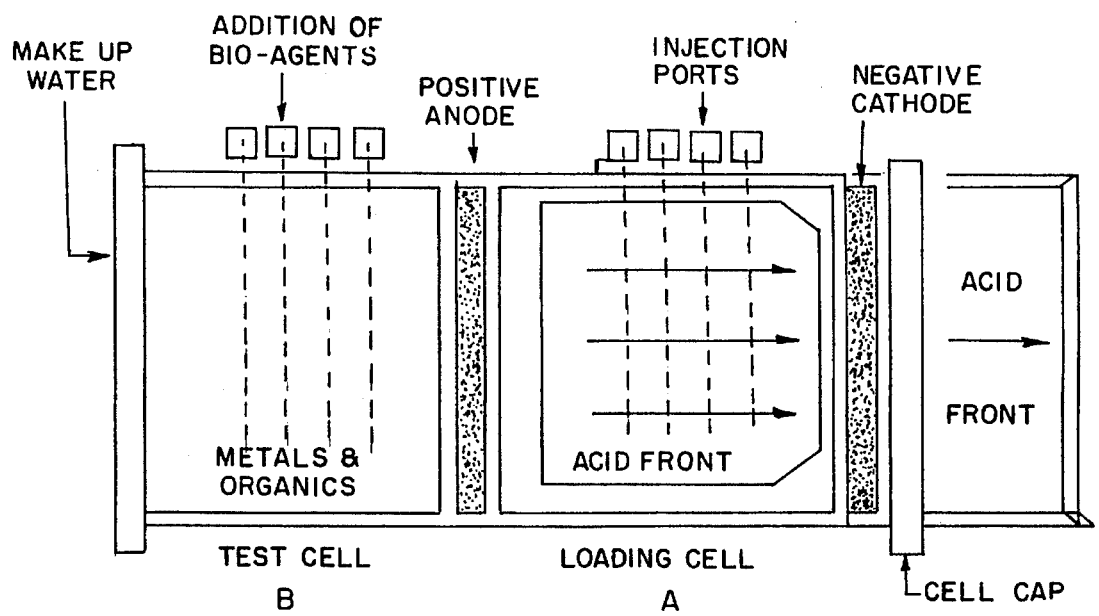
FIG. 13 shows the application of electrokinetic pulsed or reverse flows.

FIG. 13 shows how a laboratory demonstration can use directional orientation of the electrokinetic process for insitu destruction of organic pollutants without removal of hazardous metals or radionuclides. Cell A contains clean soil, while cell B contains soil contaminated with organics and metals. The positive anode is shown between the cells while the negative cathode is at the right. The electrokinetic process is started up and biological agents (adapted microbial populations and inorganic/organic growth factors) are added. The relatively uniform movement of the pore fluid across cell B results in distribution of the biological agents necessary for destruction of the organic compounds. It is noted that the acid front of 1.5 pH does not enter the test cell, as this event would result in partial incapacitation of the microbial population. The metals remain in place while the biodegradation is being completed. In some cases, it will be useful to add additional carbon based materials if the metal toxicity is found to be restrictive. The biological agents are uniformly distributed throughout the soil structure as a result of the total cross-sectional laminar flow resulting from the electrokinetic pumping effect. In cases of fissured soils by extension of tree roots and other causes, it is expected that the bulk of the organic contaminants and the electrokinetic pore fluid flows will follow similar paths of least resistance and high biodegradation efficiencies will be achieved.

Surface active agents that may be used include addition of biodegradable surfactants such as anionic, cationic and non ionic surfactants, for expediting removal of polar and non polar hydrocarbons through monomer and micellating techniques.

When the biodegradation is completed, the negative cathode is moved to the left side of cell B and the direct current is applied. This will result in reverse movement of the acid front from cell A into cell B and the metals are extracted from the contaminated soil by conventional electrokinetic soil processing.

Figure 14:
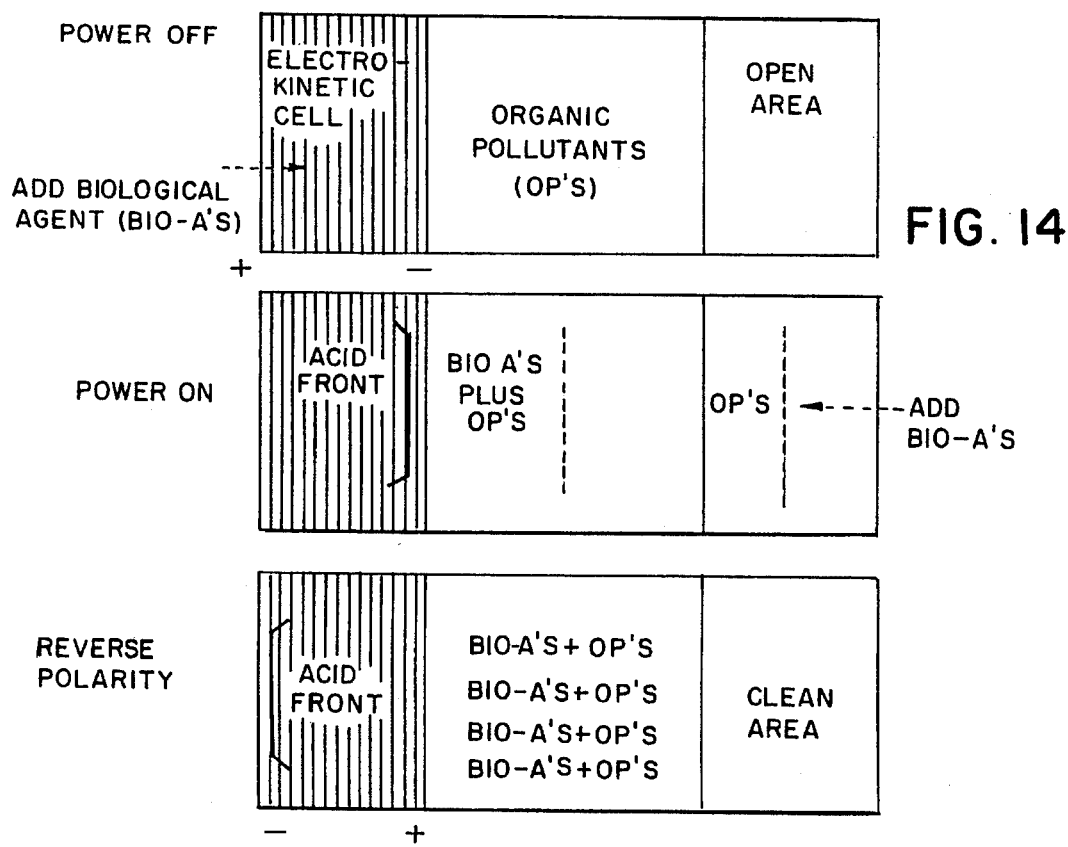
FIG. 14 shows a plan view of a scenario where organic pollutants are found in a contaminated soil.

FIG. 14 shows how microbial agents can be initially injected into a contaminated field site for removal of organic pollutants (OP's). The biological agents (BIO-A's) are first injected into the clean soil to the left of the contaminated site (top picture). The electrokinetic cell A "pushes" the biological agents part way into the contaminated site where the BIO-A's mix with the OP's. BIO-A's are now injected into the clean soil on the opposite side of the site (middle picture). The electrokinetic cell polarity is now reversed and the BIO-A's are now "pulled" into the contaminated site from the opposite side (bottom picture). This electrokinetic generated push-pull effect can be used repeatedly to enhance biodegradation efficiency. Many variations of this scheme can be envisaged, such as use of multiple electrokinetic direct current fields to more rapidly complete an insitu bioremediation. The acid fronts, however, produced by the electrokinetic cells are carefully monitored to insure that the acid fronts are not commingling with the biological agents.

Figure 15:
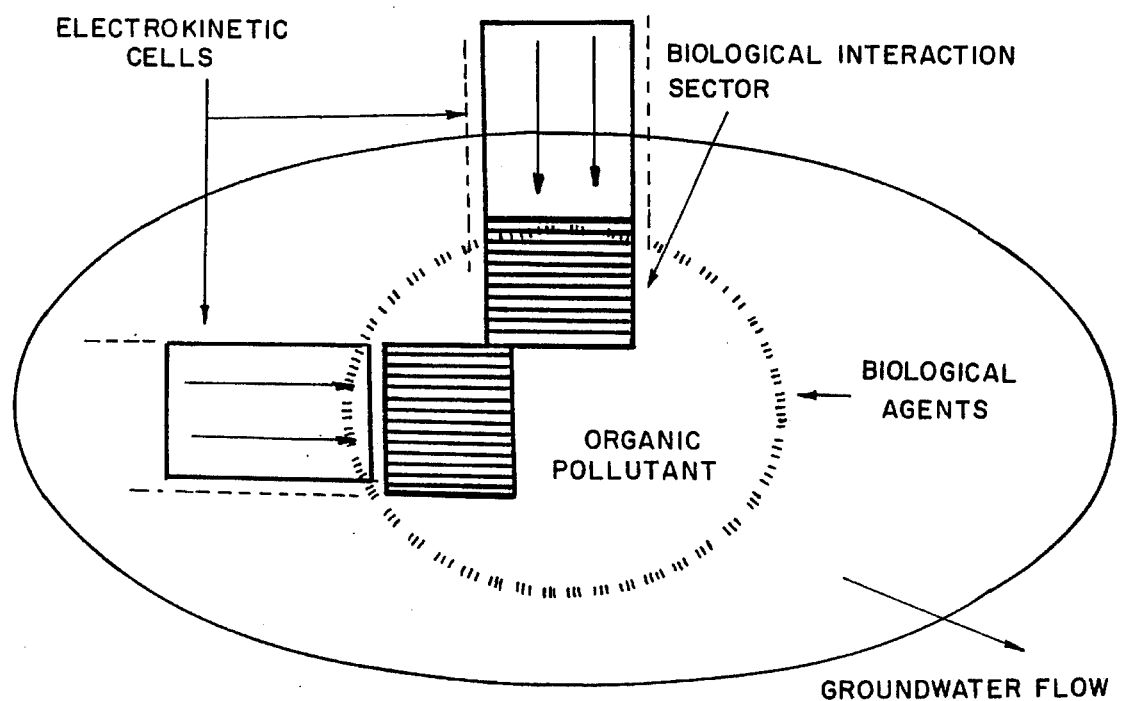
FIG. 15 shows a plan view where multiple electrokinetic cells can be placed around a contaminated soil site.

FIG. 15 shows the situation where an organic pollutant is moving in a natural subsurface groundwater flow and two directional electrokinetic cells are used to push biological agents into the contaminated pore fluid. As the electrokinetic process is highly portable, the cells can be moved ahead of the advancing groundwater and biological agents can continue to be injected into the moving plume of contamination. In this case the biological agents are directionally pulsed into the flowing groundwater streams and care is taken to avoid any commingling of the produced clay acids with the biological agents.

While the invention has been described with reference to specific embodiments, modifications and variations of the invention may be constructed without departing from the scope of the invention, which is defined in the following claims.

TABLE 1

Key Properties of Clay Minerals

1. Types of Electrochemical Properties acting within and between particles

| Type of Force | Source | Relative Strength | Distance in Angstroms |
|---|---|---|---|
| primary valence bond | electron donor | very strong | 1–2 |
| hydrogen bond/cation | cation attraction | strong | 2–3 |
| van der Waals | dipole moments | weak | >5 |
| electrostatic | electrical | very weak | >>5 |

2. Properties of aqueous solutions of negatively charged clay particles
  a. attract and orient the dipoler water molecules near the clay surface.
  b. attract cations to the particle surface where the cation TABLE 1-continued Key Properties of Clay Minerals concentration is inversely related to the distance from the particle surface (diffuse double layer).
  c. Ability to adsorb cations measured by cation exchange capacity. Ease of cation exchange based on size and valence of the hydrated ion and ion concentration.
3. The structural arrangement of clay particles is characterized by;
  a. Flocculent if double layer is small so particle attraction occur at all relative orientations or a positive concentration on the particle edges produces edge-to-face attraction. Flocculation is enhanced by; increasing ion concentration, increasing adsorbed cation valence, decreasing size of exchangeable cations, or decreasing pH of fluid.
  b. Disperse if double layer is large enough that repulsive forces keep particles separate.
4. Important Electrochemical forces of observed phenomena of cohesive soils
  Sensitivity, thixotrophy, and electroosmosis.

TABLE 2

Distribution of Microorganisms in Various Horizons of the Soil Profile (Organisms/gram of Soil × $10^3$)

| Depth cm | Aerobic Bacteria | Anaerobic Bacteria | Actinomycetes | Fungi | Algae |
|---|---|---|---|---|---|
| 3–8 | 7800 | 1950 | 2080 | 119 | 25 |
| 20–25 | 1800 | 379 | 245 | 50 | 5 |
| 35–40 | 472 | 98 | 49 | 14 | — |
| 65–75 | 10 | 1 | 5 | 6 | — |

Note: Table I from A. Starc, 1942. Arch. Mikrobiol., 12: 329–352.[1]

TABLE 3

Relative Sizes of Soil Constituents

| | Diameter of Thickness (micrometers) |
|---|---|
| Inorganic constituents | |
| Sand | 50–2000 |
| Silt | 2–50 |
| Clay | <2 |
| Clay pore size | 0.3–10 |
| Microorganisms | |
| Regular soil bacteria | 0.5–1.0 |
| Armored soil bacteria | 1.0–1.5 |
| Actinomycetes | 1.0–1.5 |
| Fungi | 0.3–10 |
| Plants | |
| Root hairs | 10–14 |
| Root cylinders | 40–100 |

Adapted from J.M. Lynch, 1983. Soil Biotechnology. Microbiological Factors in Crop Productivity.

TABLE 4

Impact on Oxygen Uptake from Addition of Nitrogen, Sulfur, and Phosphorus to Oilfield Production Pit Sludge

| | Oxygen Uptake - mg/l | | |
|---|---|---|---|
| Macronutrient | Nitrogen only | Phosphorus only | Sulfur only |
| Time 24 hours | 150 | 70 | 70 |
| Time 48 hours | 380 | 90 | 90 |
| Time 72 hours | 640 | 130 | 130 |

R. E. Marks, S. D. Field, A. K. Wojtanowicz, 1988. Biodegradation of Oil-Based Drilling Muds and Production Pit Sludges, "Transactions of the ASME, Journal of Energy Resources Technology, Vol. 110, No. 3, 9/88.

TABLE 5

Plate Counts using Adapted Microbial Culture
Inoculum to Test Hazardous Organic Wastes on Solid
Pour Plates using Plain Agar and Inorganic Nutrients

| Compound | Culture A (refinery sludge) plate counts (cfu/ml) | Culture B (petrochemical sludge) plate counts (cfu/ml) |
|---|---|---|
| Refinery sludge | $10^7$ | n/a |
| Petrochemical sludge | n/a | $10^8$ |
| Benzene - 700 mg/l | $10^9$ | $10^{10}$ |
| Toluene - 870 mg/l | $10^8$ | $10^8$ |
| Methylene chloride - 660 mg/l | $10^7$ | $10^6$ |
| Mixed xylenes - 860 mg/l | $10^5$ | $10^6$ |
| Pentachlorophenol - 800 mg/l | $10^8$ | did not plate |
| P-Cresol - 1000 mg/l | did not plate | $10^{10}$ |
| Dotriacontane - 1250 mg/l | $10^7$ | $10^7$ |
| Phenanthrene - 500 mg/l | $10^6$ | $10^6$ |
| Benzo(a)anthracene - 500 mg/l | $10^6$ | $10^5$ |
| Benzo(a)pyrene - 500 mg/l | $10^5$ | $10^3$ |

S. D. Field, A. K. Wojantowicz, R. E. Marks, L. Forbes. 1988. "Biological Treatment of Petroleum and Petrochemical Hazardous Wastes, "Proceedings of second Annual Symposium on Hazardous Waste Research, HWRC, LSU, Baton Rouge LA.

S. D. Field, Marks, R. E., D. Ours, A. K. Wojtanowicz. 1989. "Biological Treatment of Petrochemical Sludges, "Proceedings of the Third Annual Symposium of Hazardous Waste Research, HWRC, LSU, Baton Rouge, LA.

TABLE 6

Ease of Ion Replacement and
Cation Exchange Capacity of Clay Minerals (1) relative ease of replacement of ions shown below[1]
$Li^+ < Na^+ < H^+ < K^+ < NH_4^+ < Mg^{++} < Ca^{++} < Al^{+++}$
ions of higher valence and hydration size replaces another of the same concentration
(2) cation exchange capacity of the more common clay minerals[2]

| mineral | structural control | exchange capacity meq/100 g at pH 7 |
|---|---|---|
| Kaolinite | unsatisfied valences on edges of structures | 3–15 |
| Halloysite (2H$_2$O) | unsatisfied valences on edges of structures | 5–15 |
| Halloysite (4H$_2$O) | unsatisfied valences on edges of structures | 40–50 |
| Illite | octahedral/tetrahedryl substitutions, edges and K$^+$ deficiency between layers | 10–40 |
| Allophane | amorphous structure, unsatisfied valences | 70 |
| Montmorillonite | octahedral/tetrahedral substitutions and edges | 70–100 |
| Vermiculite | replacement interlayer cations, substitutions | 100–150 | notes:
[1] Data from: Perloff & Baron. Ion Exchange. In Soil Mechanics: Principles and Applications, J. Wiley, NY, pp. 403–405 (1976).
[2] Data from: Garrels and Christ. Cation Exchange. In Solutions, Minerals and Equilibria. Freeman, Cooper & Co. San Francisco, pp. 269–272 (1965).

We claim:

1. An insitu soil remediation method, comprising placing an anode and a cathode in uncontaminated or contaminated soil, applying a direct current (DC) potential between the anode and the cathode, pushing a flow of groundwater toward the cathode, injecting and transporting nutrients, process additives and biological agents into the uncontaminated or contaminated soil between the anode and the cathode, using multi-species transport mechanisms under electrical fields including electrokinetic processes for pushing the flow of microbial-laden and nutrient-laden groundwater into soil contaminated with organic pollutants and hazardous metals, reversing a DC polarity for pulling and pushing of the biological agents from either uncontaminated soil or other contaminated soil, repeating the pushing and pulling cycle to increase subsurface contacting between the microbial populations and the organic pollutant food sources, and further comprising electrokinetic processing of the soil for removal of the hazardous metals until soil remediation is completed.

2. The method of claim 1, wherein the processing comprises adjusting a pH of the process water or liquids for either depolarization of the anode or the cathode reactions.

3. The method of claim 2, wherein the microbial agents are injected into the subsurface clean soil directly adjacent to the contaminated soil and the electrical field is then applied to other clean soil directly between the clean soil containing the microbial population and contaminated soil, then the pH of the electrokinetic groundwater movement into the contaminated soil will be the same as the natural soil pH and significantly increases the biodegradation of the organic pollutants in the subsurface contaminated soil.

4. The method of claim 3, comprising directionally oriented multiple electrokinetic cells for injecting maximum quantities of biological agents at pH of the natural soil, into contaminated groundwater plumes.

5. The method of claim 2, further comprising adding acetic, adipic or similar acids for depolarization of the cathode and control of oxide-hydroxide precipitation in the proximity of the cathode.

6. The method of claim 5, further comprising using tank-stored process liquids produced at the cathode to depolarize either the cathode or anode reactions and further inhibit the precipitation of the hazardous metals.

7. The method of claim 5, further comprising bypassing soil acids produced at the anode for direct polarization of the cathode and alleviation of the precipitation reaction of hazardous and other heavy metals.

8. The method of claim 5 using a desolubilizing agent for preventing solubilizing of the large quantities of calcium found in soils and thus enhancing the electromotive series removals of hazardous metals of interest.

9. The method of claim 1, wherein the injecting of biological agents comprises adding substances selected from a group consisting of microbial populations, inorganic growth factors, organic growth factors, bioremediation process additives and surface active agents.

10. The method of claim 3, wherein the adding further comprises addition of diverse microbial populations selected from groups consisting of indigenous, acclimated and adapted biological populations.

11. The method of claim 10, wherein adding of adapted or acclimated microorganisms comprises storing water in a tank and adding microorganisms to the tank, the stored water containing organic materials similar to that found in the groundwater and the contaminated soil.

12. The method of claim 11, further comprising recovering the microorganisms from polluted soils, culturing the recovered microorganisms and adding nutrient growth factors to the microorganisms.

13. The method of claim 11, further comprising supplying crop residues, wood cellulose and other forest detritus, as energy sources which can be biologically oxidized by the microorganisms.

14. The method of claim 9, wherein adding growth factors comprises adding macronutrients selected from a group consisting of carbon, nitrogen, phosphorus, sulfur and potassium sources, micronutrients including metals, and organic growth factors selected from a group consisting of carbon-based compounds, amino acids and vitamins.

15. The method of claim 9, wherein adding surface active agents comprises adding biodegradable surfactants selected from a group consisting of anionic, cationic and non ionic surfactants, for expediting removal of polar and non polar hydrocarbons through monomer and micellating techniques.

16. The method of claim 1, wherein the injection comprises any or all insitu processes selected from a group consisting of electrokinetic soil processing with acid front movement, overburden soil surface flooding, injection in bore holes, and drip injection.

17. The method of claim 1, further comprising moving the microorganisms into an insitu subsurface contaminated soil through directional electrokinetic control of transport of the groundwater, biological growth factors and process additives.

18. The method of claim 17, further comprising multiple injecting microorganisms and other biological agents into moving groundwater plumes or other surface and subsurface spills which are contaminated with organic pollutants.

19. The method of claim 1, wherein the electrokinetic soil process is used to remove hazardous metals.

* * * * *